US010970763B1

(12) United States Patent
Allen

(10) Patent No.: US 10,970,763 B1
(45) Date of Patent: Apr. 6, 2021

(54) MATCHING ENGINES AND GRAPHICAL USER INTERFACES FOR PARTNER RECOMMENDATIONS AND LEAD SHARING

(71) Applicant: Vantiv, LLC, Symmes Township, OH (US)

(72) Inventor: Christopher Allen, Highlands Ranch, CO (US)

(73) Assignee: Worldpay, LLC, Symmes Township, OH (US)

( * ) Notice: Subject to any disclaimer, the term of this patent is extended or adjusted under 35 U.S.C. 154(b) by 700 days.

(21) Appl. No.: 15/367,944

(22) Filed: Dec. 2, 2016

(51) Int. Cl.
*G06Q 30/06* (2012.01)
*G06F 3/0482* (2013.01)
*G06Q 20/10* (2012.01)

(52) U.S. Cl.
CPC ....... *G06Q 30/0605* (2013.01); *G06F 3/0482* (2013.01); *G06Q 20/10* (2013.01)

(58) Field of Classification Search
CPC .................................................... G06Q 30/06
See application file for complete search history.

(56) References Cited

U.S. PATENT DOCUMENTS

| 7,251,624 B1* | 7/2007 | Lee ........................ G06Q 30/06 705/26.1 |
| 2003/0171975 A1* | 9/2003 | Kirshenbaum .... G06Q 30/0204 705/7.33 |
| 2013/0191223 A1* | 7/2013 | Harris ............... G06F 16/24575 705/14.66 |
| 2013/0246120 A1* | 9/2013 | Chang ................ G06Q 30/0204 705/7.29 |
| 2015/0134488 A1* | 5/2015 | MacLaurin ........ G06Q 30/0639 705/26.62 |
| 2016/0055600 A1* | 2/2016 | Chau .................. G06Q 30/0222 705/15 |

* cited by examiner

*Primary Examiner* — Kurtis Gills
(74) *Attorney, Agent, or Firm* — Bookoff McAndrews, PLLC

(57) ABSTRACT

Systems and methods for assisting in pairing entities in an electronic payments processing network are disclosed herein. For example, systems and methods are disclosed herein for generating a customized user interface for displaying a plurality of potential partners/resellers for pairing with one or more leads. Systems and methods herein may be used to receive the identity of one or more potential partners/resellers having a plurality of attributes, receive the identity of one or more new leads and a plurality of lead attributes, select one or more potential partners/resellers having attributes that are compatible with the plurality of lead attributes, and display the one or more potential partners/resellers on a graphical user interface.

20 Claims, 18 Drawing Sheets

| DATE | SOURCE | CONTACT | COMPANY | LOCATION | |
|---|---|---|---|---|---|
| 03/28/16 10:06 AM | BUSINESS.COM | TINA STRATTON | THE ROSE COTTAGE... | GA, KENNESAW | MANAGE |
| 03/27/16 02:56 AM | MERCURYPAY.COM | WILLIAM GALLEY | HA-TECHS-MARKETO | NV, RENO | MANAGE |
| 03/25/16 01:29 PM | MERCURYPAY.COM | FINANCE OFFICER | HASTINGS MUSEUM... | NE, RAVENNA | MANAGE |
| 03/25/16 12:03 PM | MERCURYPAY.COM | JERRI MUELLENBERG | SNOWBELT BREWERY... | MI, GAYLORD | MANAGE |
| 03/25/16 10:28 AM | BUSINESS.COM | ANGELA AQUINO | 90 WEST LOUNGE... | CA, LOS ANGELES | MANAGE |
| 03/25/16 10:14 AM | BUSINESS.COM | SALIM ZAYTOUN | CAFE PARADISO... | DC, WASHINGTON | MANAGE |
| 03/25/16 10:11 AM | BUSINESS.COM | SUSAN GILBERT | GOURMET CAFE... | KY, COXS CREEK | MANAGE |
| 03/25/16 09:02 AM | BUSINESS.COM | RAE SCHNAPP | CITYFOODS CO-OP... | IN, WEST LAFAYETTE | MANAGE |
| 03/24/16 10:47 PM | MERCURYPAY.COM | CHARLES RUTLER | PHERBAR-MARKETO | BANGKOK | MANAGE |
| 03/24/16 04:21 PM | MERCURYPAY.COM | JENNA BARRAZA | THE NOOK-MARKETO | TX, KILLEEN | MANAGE |
| 03/24/16 03:08 PM | BUSINESS.COM | BRIAN RHODES | SPLENDIDO-MARKETO | CO, AVON | MANAGE |
| 03/24/16 02:39 PM | BUSINESS.COM | TAD MARTIN | COWBOYHOGS-MARKETO | OH, WAUSEON | MANAGE |

Window 1100 (Account Revel System tab):

1. WHAT TYPE OF BUSINESS ARE YOU? — BAR (1102)
2. WHAT IS THE ZIP CODE WHERE SERVICE IS NEEDED TO BETTER HELP LOCATE LOCAL PROVIDERS? — 30152 (1104)
3. DO YOU HAVE ONE OR MULTIPLE LOCATIONS TODAY? — ONE LOCATION (1106)
4. IS THIS A NEW OR EXISTING BUSINESS? — NEW (1108)
5. DO YOU HAVE A TECHNICAL PERSON ON STAFF TO OVERSEE THE POINT OF SALE? — SELECT / YES / NO / IN PROCESS (1110)
6. HOW DO YOU PLAN TO PAY FOR THE POS SYSTEM? — SELECT
7. CAN I SUBMIT YOUR INFORMATION TO GET A QUOTE ON PAYMENT PROCESSING AND GIFT CARDS? — SELECT
8. DO YOU STRICTLY PREFER MOBILE TABLET POS SOLUTION? — SELECT

PAIR NOW (1112)

Browser tabs: PARTNER ACCOUNTS / VANTIV INTEGRATED PAYMENTS / ACCOUNT REVEL SYSTEM
URL: HTTPS://WWW.MERCURYPAY.COM/APPS/NETLEADS/GLIST
(1002)

FIG. 13

FIG. 15 vantiv/integrated payments

USERS / SPECIFY SECURITY USER PERMISSION

YOU ARE HERE: HOME / SETTINGS / USER

NAVIGATION
- DASHBOARD
- LEAD SHARING +
- PROMOTIONS +
- REPORTS +
- SETTINGS −
  - USERS
  - PARTNER ACCOUNTS

[+ ADD USER]

SHOW [10] ENTRIES        SEARCH: [    ]

| NAME | EMAIL | MAIN GROUP | STATUS | |
|---|---|---|---|---|
| WILLIAM DOE | WILLIAM.DOE@VANTIV.COM | MANAGER | ACTIVE | ⟡ EDIT ▸ |
| JANET DOE | JDOE@MERCURYPAY.COM | ADMINISTRATOR | ACTIVE | ⟡ EDIT ▸ |
| MATTHEW DOE | MDOE@MERCURYSITE.COM | SOLUTIONS CONSULTANT | IN-ACTIVE | ⟡ EDIT ▸ |
| FRANK DOE | FRANK.DOE@VANTIV.COM | SUPER ADMINISTRATOR | ACTIVE | ⟡ EDIT ▸ |
| GEORGE DOE | GDOE@MERCURYPAY.COM | SUPER ADMINISTRATOR | ACTIVE | ⟡ EDIT ▸ |
| IVAN DOE | IVAN.DOE@ELEMENTS.COM | MANAGER | ACTIVE | ⟡ EDIT ▸ |
| BETTY DOE | BDOE@MERCURYPAY.COM | MANAGER | ACTIVE | ⟡ EDIT ▸ |
| ANGELA DOE | AGDOE@MERCURYPAY.COM | MANAGER | ACTIVE | ⟡ EDIT ▸ |
| MELISSA DOE | MELISSA.DOE@VANTIV.COM | SUPER ADMINISTRATOR | ACTIVE | ⟡ EDIT ▸ |
| THOMAS DOE | THOMAS.DOE@VANTIV.COM | SUPER ADMINISTRATOR | ACTIVE | ⟡ EDIT ▸ |

SHOWING 1 TO 10 OF 113 ENTRIES        [1] 2 3 4 5 … 12

MATCHING ENGINES AND GRAPHICAL USER INTERFACES FOR PARTNER RECOMMENDATIONS AND LEAD SHARING

TECHNICAL FIELD

The embodiments disclosed herein relate generally to matching engines and graphical user interfaces ("GUIs") for data processing networks. More specifically, the embodiments disclosed herein relate to matching engines and GUIs for partner recommendations and lead sharing relating to payments processing networks, and systems and methods thereof.

BACKGROUND

Many brick and mortar merchants use electronic point of sale (POS) terminal systems to perform transaction accounting and payment processing, including both for payment cards and electronic payments. One development in POS terminal systems has been the establishment of third party electronic payment management service providers (also known as acquiring banks and their affiliates) who securely and reliably aggregate and direct electronic payment requests from merchants' POS terminals through payment networks to payment card companies' payment systems, and thus act as payment intermediaries. Such electronic payment management services may also provide merchants greater control over the processing of electronic payments via Arbitraged Enhanced Payment (AEP) services including, but not limited to, how rapidly a given payment is processed, what entity processes a given payment, and/or enhanced payment security measures. From time to time, a given merchant may select a new electronic payment management service. The process of integrating a new merchant account's POS terminal system(s) and corresponding payments stream into an arbitraged enhanced payments processing system (AEPPS) is commonly termed "merchant boarding."

Merchants are now often assisted with merchant boarding by a variety of intermediary partners (sometimes known as resellers) including, but not limited to, independent sales organizations (ISOs) and POS system developers and vendors. Such partners may also assist merchants with aspects of AEP services beyond merchant boarding. For example, a merchant's POS terminal's components may be sourced from several manufacturers, and may be integrated and maintained over time by third party POS system developers and vendors. An ISO may, for example, serve as an aggregating entity that may modify or augment transactional content exchanged with a given POS terminal system.

To maximize earning potential, acquiring banks may want to add as many new merchants (sometimes referred to by acquiring banks and partners/resellers as "leads") to an electronic payment management service as possible. Leads may be recruited to an electronic payment management service through initial contact with an intermediary partner such as an ISO or a POS system vendor, or leads may also directly contact electronic payment management services, e.g., via signing up online without the involvement of a partner. Acquiring banks and/or partners may also wish to share lead information with one another to, for example, expedite and streamline the merchant boarding process and the providing of AEP services to a lead. There exists a need for matching engines and graphical user interfaces for partner recommendations and lead sharing, and systems and methods thereof.

There further exists a need for a system and method to track and promote assistance provided by partners to leads during the merchant boarding process and with AEP services beyond merchant boarding, such as implementing enhanced payment security measures for a lead. There also exists a need for a GUI suitable for providing a user with representations and summaries of the assistance provided by partners to leads during the merchant boarding process and with AEP services.

SUMMARY

Methods are disclosed for automatically generating a customized display on a graphical user interface by: receiving, at a processor, an electronic database comprising a plurality of potential partners and a plurality of attribute categories, each potential partner having an attribute corresponding to each attribute category; receiving, at the processor, a plurality of threshold eligibility attributes, each threshold eligibility attribute corresponding to at least one of the plurality of attribute categories; using the processor to automatically narrow the plurality of potential partners using one or more of the plurality of threshold eligibility attributes as one or more narrowing attributes; using the processor to construct an electronic questionnaire, wherein the questionnaire comprises a plurality of answerable prompts that may be displayed on a graphical user interface; using the processor to transmit the questionnaire to an interactive lead user interface over an electronic network; receiving, at the processor, one or more answers to the questionnaire via the lead user interface over the electronic network, wherein each answer comprises at least one lead attribute that corresponds to one of the plurality of attribute categories; using the processor to automatically narrow the plurality of potential partners using the at least one lead attribute as at least one narrowing attribute; and displaying the at least one lead attribute and the narrowed plurality of potential partners on a results user interface of the graphical user interface.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 4 shows an exemplary view of a graphical user interface providing partner details, according to an exemplary embodiment.

FIG. 7 shows an exemplary view of a graphical user interface providing information about leads, according to an exemplary embodiment.

FIG. 9 shows another exemplary view of a graphical user interface providing further lead details, according to an exemplary embodiment.

FIG. 10 shows an exemplary view of a graphical user interface providing a lead questionnaire, according to an exemplary embodiment.

FIG. 11 shows another exemplary view of a graphical user interface providing a lead questionnaire, according to an exemplary embodiment.

FIG. 13 shows an exemplary view of a graphical user interface providing partner performance details, according to an exemplary embodiment.

FIG. 15 shows an exemplary view of a graphical user interface providing user information, according to an exemplary embodiment.

DESCRIPTION OF THE EMBODIMENTS

Reference will now be made in detail to exemplary embodiments, examples of which are illustrated in the accompanying drawings. Wherever possible, the same reference numbers will be used throughout the drawings to refer to the same or like parts.

Figure 1A:
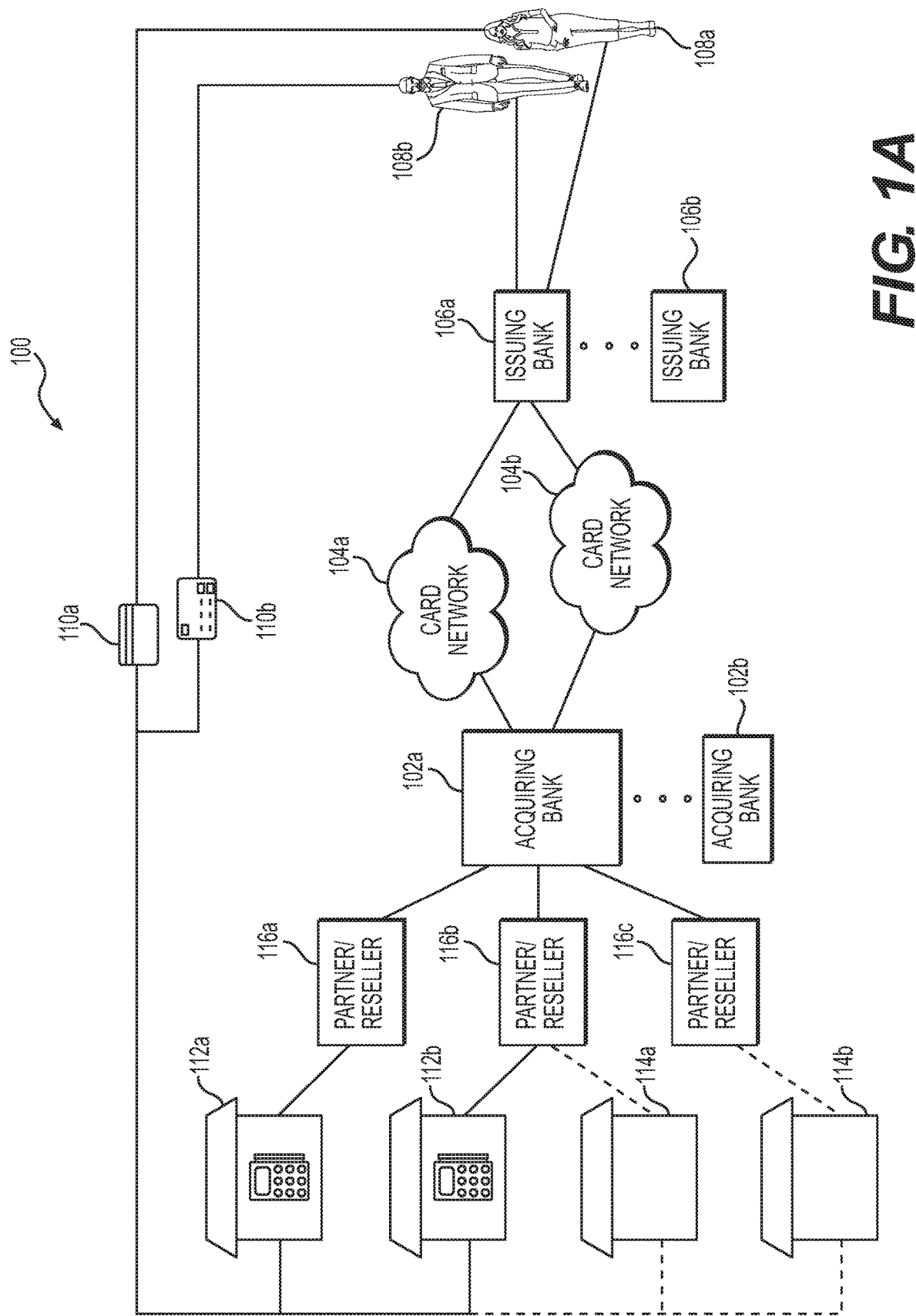
FIG. 1A is a schematic diagram of a system depicting the general arrangement between merchants, partners, consumers, electronic payment management service providers, and payment networks, according to an exemplary embodiment.

FIG. 1A depicts a payments processing network 100 generally comprising a plurality of merchants 112a, 112b, new leads 114a, 114b, partner/resellers 116a, 116b, 116c, acquiring banks 102a, 102b, issuing banks 106a, 106b, and consumers 108a, 108b, all provided in communication with each other via one or more payment networks 104a, 104b. The components of processing network 100 may be connected by any combination of wired or wireless networks, including, for example, PSTNs and/or the Internet. As shown in FIG. 1, acquiring bank 102a may have partnerships with one or more payment networks 104a, 104b, such that the acquiring bank 102a may process payments through, and on behalf of, payment networks 104a, 104b. Payment networks 104a, 104b may in turn have partnerships with one or more issuing banks 106a, 106b. Issuing banks 106a, 106b may hold accounts for one or more consumers 108a, 108b with accounts at issuing banks 106a, 106b. Consumers 108a, 108b may have payment vehicles, e.g., one or more payment cards 110a, 110b (e.g., credit cards, debit cards, stored value cards, etc.), each of which may be affiliated with a payment network, e.g., payment network 104a or 104b. Consumers 108a, 108b may be able to use their payment cards 110a, 110b at one or more merchants 112a, 112b and/or one or more new merchant leads 114a, 114b to purchase goods and services. Merchants 112a, 112b may already be using the services of an acquiring bank such as acquiring bank 102a through, for example, at least one partner/reseller (or "partner") 116a, 116b, whereas new merchant leads 114a, 114b may be potential new customers of acquiring bank 102a and/or a partner such as partner 116b or 116c. Partners 116a, 116b may act to provide merchant boarding services and Arbitraged Enhanced Payment (AEP) services to merchants 112a, 112b, and may act as intermediaries between acquiring bank 102a and merchants 112a, 112b. New merchant leads 114a, 114b not yet affiliated with a partner or acquiring bank 102a may have contacted acquiring bank 102a and expressed interest in using electronic payment processing services provided by acquiring bank 102a and the payment networks 104a, 104b. Partners 116b, 116c may be candidates for pairing with, and providing services (such as merchant boarding and AEP services) to, new leads 114a, 114b.

Acquiring banks 102a, 102b may be entities that provide a variety of electronic payment processing services to merchants 112a, 112b, with the assistance of one or more intermediary partners 116a, 116b, 116c. For example, acquiring bank 102a may be an entity that receives payment information from a transaction which occurs at a POS terminal at, for example, merchant 112a. The payment information may be, for example, payment card information encoded in the magnetic stripe or EMV chip of payment card 110a and a payment amount of a transaction being made by, for example, consumer 108a with merchant 112a using the payment card account associated with payment card 110a. Acquiring bank 102a may process the information, and may send the information to the consumer's respective issuing bank, e.g., issuing bank 106a, via an appropriate payment network 104a, depending on the particulars of payment card 110a. Processing the information may include, for example, determining the identities of payment network 104a and issuing bank 106a associated with the particular payment card 110a.

Acquiring banks 102a, 102b may also receive information from payment networks 104a, 104b, such as a confirmation or rejection of an attempted transaction using payment cards 110a, 110b, and may convey that information to the appropriate POS terminal. Moreover, acquiring banks 102a, 102b may provide security and/or encryption services to merchants 112a, 112b and payment networks 104a, 104b, such that payments processed at one or more POS terminals of merchants 112a, 112b may be completed with a decreased risk of data or financial theft or loss. Acquiring banks 102a, 102b may be located, for example, remotely from merchants 112a, 112b that use their services, and may, for example, interact with merchants 112a, 112b primarily over an electronic network, such as a data network or the Internet. Acquiring banks 102a, 102b may also interact with one or more partners 116a, 116b that provide specific services to merchants 112a, 112b, as described above. For example, if a POS terminal that is initiating a given transaction was provided to merchant 112a by partner 116a, then partner 116a may perform some additional processing of the transaction before or as the transaction is forwarded to acquiring bank 102a.

Payment networks 104a, 104b may be, for example, networks that relay debit and/or credit transactions to and from various accounts at issuing banks 106a, 106b. For example, payment network 104a may have a partnership program with issuing bank 106a, through which issuing bank 106a may provide a payment card account to consumer 108a associated with payment network 104a. Payment networks 104a, 104b may also be partnered with one or more acquiring banks 102a, 102b, which may manage payment transactions associated with payment networks 104a, 104b. Examples of payment network brands include, e.g., Visa, MasterCard, Discover, and American Express. Multiple payment networks 104a, 104b may be partnered with a single acquiring bank, such as acquiring bank 102a.

Issuing banks 106a, 106b may be banks that manage payment accounts associated with one or more of payment networks 104a, 104b, on behalf of one or more of consumers 108a, 108b. For example, issuing bank 106a may allow for consumer 108a to build up a revolving credit balance at issuing bank 106a, and may periodically receive payments from consumer 108a to pay down the balance. Consumers 108a, 108b may be individuals, companies, or other entities having accounts with one or more of issuing banks 106a, 106b affiliated with one or more of payment networks 104a, 104b. Each of consumers 108a, 108b may generally have at least one payment card such as payment card 110a or payment card 110b associated with each payment account held by that consumer. Each of consumers 108a, 108b may have multiple accounts with multiple issuing banks 106a, 106b, which may be affiliated with the same or different payment networks 104a, 104b.

Merchants 112a, 112b may be merchants offering goods and/or services for sale to consumers 108a, 108b, who have contracted with an acquiring bank, such as acquiring bank 102a, optionally with one or more of intermediary partners 116a, 116b. Merchants 112a, 112b may have been equipped with POS terminals (e.g., provided by one or more of partners 116a, 116b) configured to receive payment information from payment cards such as payment cards 110a, 110b and relaying received payment information to acquiring bank 102a.

New leads 114a, 114b may be merchants offering (or preparing to offer) goods and/or services for sale to consumers such as consumers 108a, 108b, who do not yet use the services of an acquiring bank such as acquiring bank 102a, and are not yet paired with a partner such as partners 116b, 116c, but who may be interested, or potentially interested, in doing so. New leads 114a, 114b may have expressed such interest in the services of acquiring bank 102a by, for example, contacting one of partners 116b, 116c, or contacting acquiring bank 102a, e.g., through a web form provided on the website of acquiring bank 102a. In cases where a new lead, such as new lead 114a, has expressed interest in using the services of an acquiring bank such as acquiring bank 102a and has contacted acquiring bank 102a directly, acquiring bank 102a may desire to pair the new lead 114a with an intermediary partner such as partner 116b who can assist the new lead 114a with providing POS terminals and related services, merchant boarding, AEP services, and/or other services needed for the new lead 114 to integrate the services of acquiring bank 102a into its business.

Partners 116a, 116b, 116c may be, for example, independent sales organizations (ISOs), or POS system developers or vendors that provide electronic payments processing services directly to one or more merchants such as merchants 112a, 112b and/or new leads such as new leads 114a, 114b. For example, partners 116a, 116b, 116c may be ISOs that may sell credit card security services, gift card services, or other "value-added" payments-related goods and services offered by acquiring bank 102a to one or more of merchants 112a, 112b and/or new leads 114a, 114b. As a further example, partners 116a, 116b, 116c may be POS vendors that may sell or lease POS terminals to one or more of merchants 112a, 112b and/or new leads 114a, 114b, and/or may maintain such POS terminals for the one or more of merchants 112a, 112b and/or new leads 114a, 114b. POS terminals may be made by multiple third-party manufacturers, and POS vendors may additionally serve as intermediaries between merchants 112a, 112b and/or new leads 114a, 114b and third-party POS terminal manufacturers. In one embodiment, partners 116a, 116b, 116c who provide software to one or more of merchants 112a, 112b and/or new leads 114a, 114b may be referred to as independent software vendors or "ISVs."

Figure 1B:
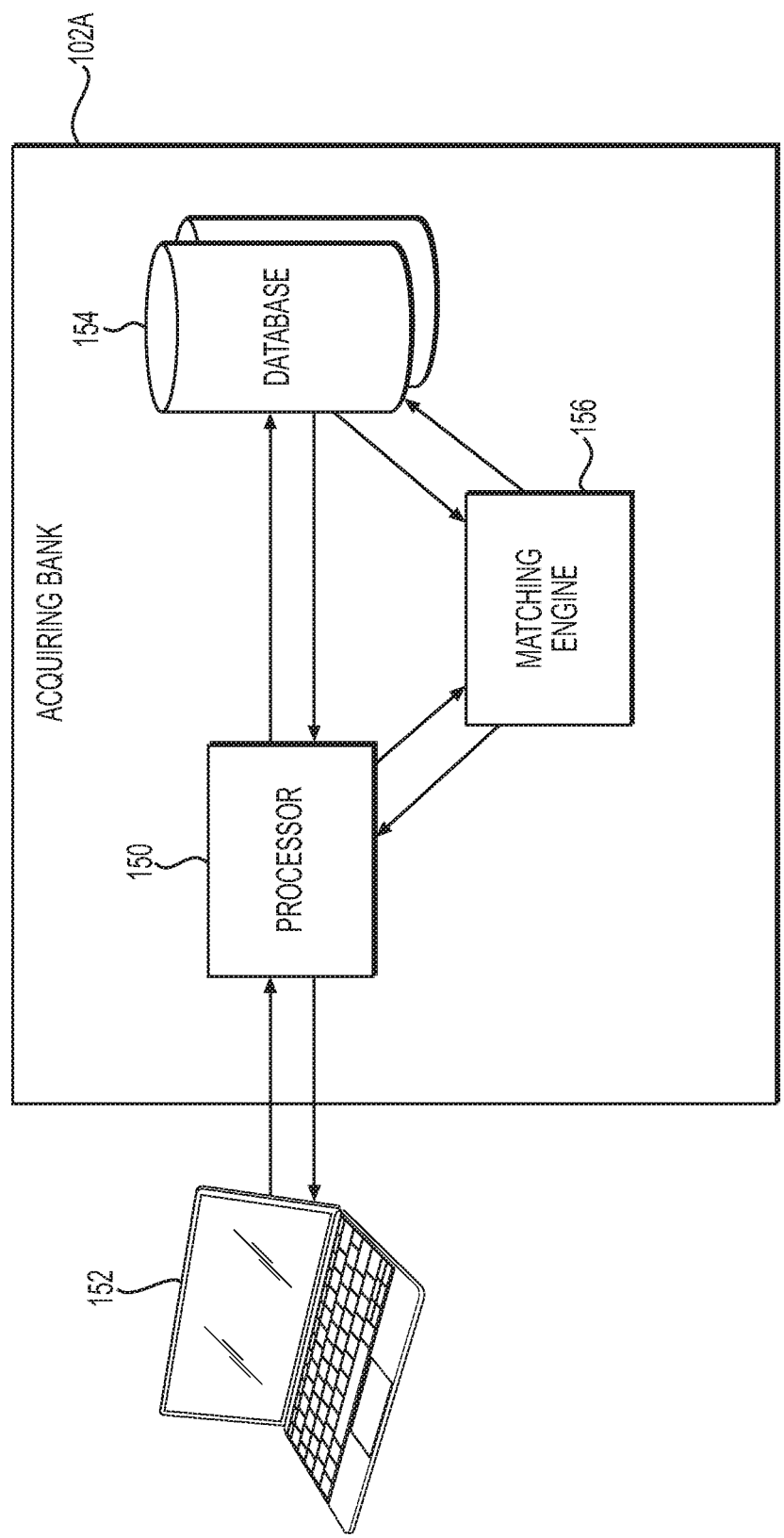
FIG. 1B is a schematic diagram of a system depicting an arrangement between a processor, a matching engine, and a database, according to an exemplary embodiment.

FIG. 1B depicts an exemplary view of an arrangement of systems in an acquiring bank system of acquiring bank 102a, for enabling acquiring bank 102a to evaluate partners 116a, 116b, 116c and match partners 116a, 116b, 116c with one or more of new leads 114a, 114b. As shown in FIG. 1B, in general, the system of acquiring bank 102A may comprise a processor 150, database 154, and matching engine 156. Processor 150 may be configured to send and/or receive data from one or more external sources, such as a computer 152. Processor 150 may be connected to at least one database 154, which may store data related to one or more of partners 116a, 116b, 116c and/or new leads 114a, 114b. Both processor 150 and database 154 may be further connected to matching engine 156, which may execute one or more matching algorithms to pair one or more of partners 116a, 116b, 116 with one or more of new leads 114a, 114b.

Processor 150 may be a computer, such as a server computer, configured to send, receive and process data transmitted between one or more computers, such as computer 152, one or more databases, such as database 154, and matching engine 156. Processor 150 may be connected to computer 152, database 154, and matching engine 156 over one or more of a wired or wireless electronic network, such as a local area network or a wide area network (e.g., the Internet). For example, processor 150 may be connected to computer 152 over the Internet, and may be connected to database 154 and matching engine 156 over a local area network.

In some embodiments, processor 150 may be a computer configured to generate graphical user interfaces, lists, database files, or other types of electronic files and transmit them to, for example, computer 152. For example, processor 150 may be configured to receive data regarding one or more new leads 114a, 114b from computer 152, automatically process received data into, for example, an electronic database format, and automatically transmit the processed received data to database 154 and/or matching engine 156. As a further example, processor 150 may be configured to receive one or more narrowing attributes from, for example, computer 152, and transmit the received narrowing attributes to the matching engine 156. Processor 150 may also be configured to receive data from database 154 and/or matching engine 156 and generate a configuration of received data to transmit to, for example, computer 152. The configuration of received data may be, for example, a database file, a text file, a graphical user interface display, or a combination thereof. For example, processor 150 may be configured to receive a list of potential partners 116a, 116b, 116c from matching engine 156, generate a graphical user interface showing the received list, and transmit the generated graphical user interface to, for example, computer 152. As a further example, processor 150 may be configured to receive a list of potential partners 116a, 116b, 116c from matching engine 156, generate a database file including the received list and additional data about potential partners 116a, 116b, 116c, and transmit the database file to, for example, computer 152.

In some embodiments, processor 150 may be configured to transmit a configuration of received data to database 154 or matching engine 156.

Computer 152 may be a computer configured to send data to, and receive data from, processor 150. For example, computer 152 may be a computer affiliated with an individual, such as an individual associated with acquiring bank 102a or one of partners 116a, 116b, 116c. As another example, computer 152 may be an intermediary computer between another user device (not shown), such as a tablet, smartphone, or other device, and processor 150. For example, computer 152 may be configured to receive data from a tablet, smart phone, or other user device and transmit received data to processor 150, and/or receive data from processor 150 and send received data to a tablet, smart phone, or other device. In some embodiments, computer 152 may include a display screen, such as a personal computer monitor, tablet screen, or mobile phone screen, on which a graphical user interface may be displayed.

Database 154 may be a computer database configured to store digital data. Database 154 may be located on, for example, one or more hard drives, such as SATA drives or solid state drives. Database 154 may be configured to send and/or receive data to and/or from processor 150 and matching engine 156. For example, processor 150 may receive data regarding one or more of new leads 114a, 114b, and may transmit such data to database 154 for storage. In some embodiments, database 154 may be configured to respond to queries for data from processor 150 and/or matching engine 156. For example, matching engine 156 may send a query to database 154 for all data relating to, for example, one or more of partners 116a, 116b, and 116c. Database 154 may respond to such a query by transmitting the requested data to matching engine 156.

Figure 12:
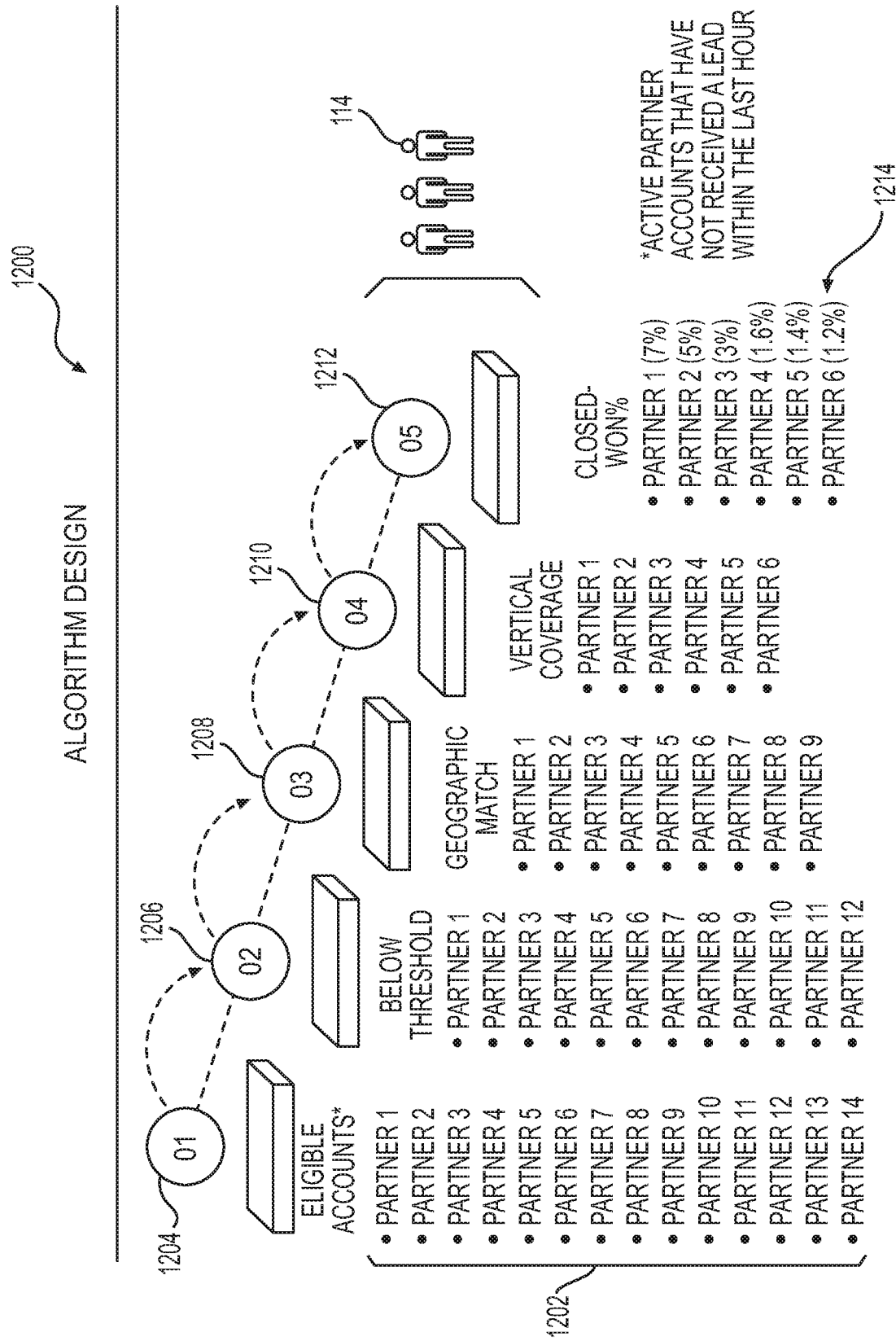
FIG. 12 shows a graphic representation of an algorithm design for narrowing potential partners according to an exemplary embodiment.

Matching engine 156 may be a computer, including a computer processor, configured to execute one or more narrowing algorithms on data received from processor 150 and database 154, such as, for example, the narrowing algorithms depicted in FIG. 12, in order to generate a list of potential partners to match with a new lead. For example, matching engine 156 may be configured to receive one or more parameters from processor 150 including one or more narrowing attributes relating to a new lead 114a, submit one or more queries for data regarding one or more partners such as partners 116a, 116b, 116c from database 154, receive data from database 154 in response to the one or more queries, and execute an algorithm based on the one or more received queries from processor 150 in order to narrow the data received from database 154. Algorithms that may be performed by matching engine 156 are described in further detail below.

In some embodiments, processor 150 may be a part of matching engine 156. In further alternative embodiments, processor 150, database 154, and matching engine 156 may all be part of a single integrated computer system.

Figure 2:
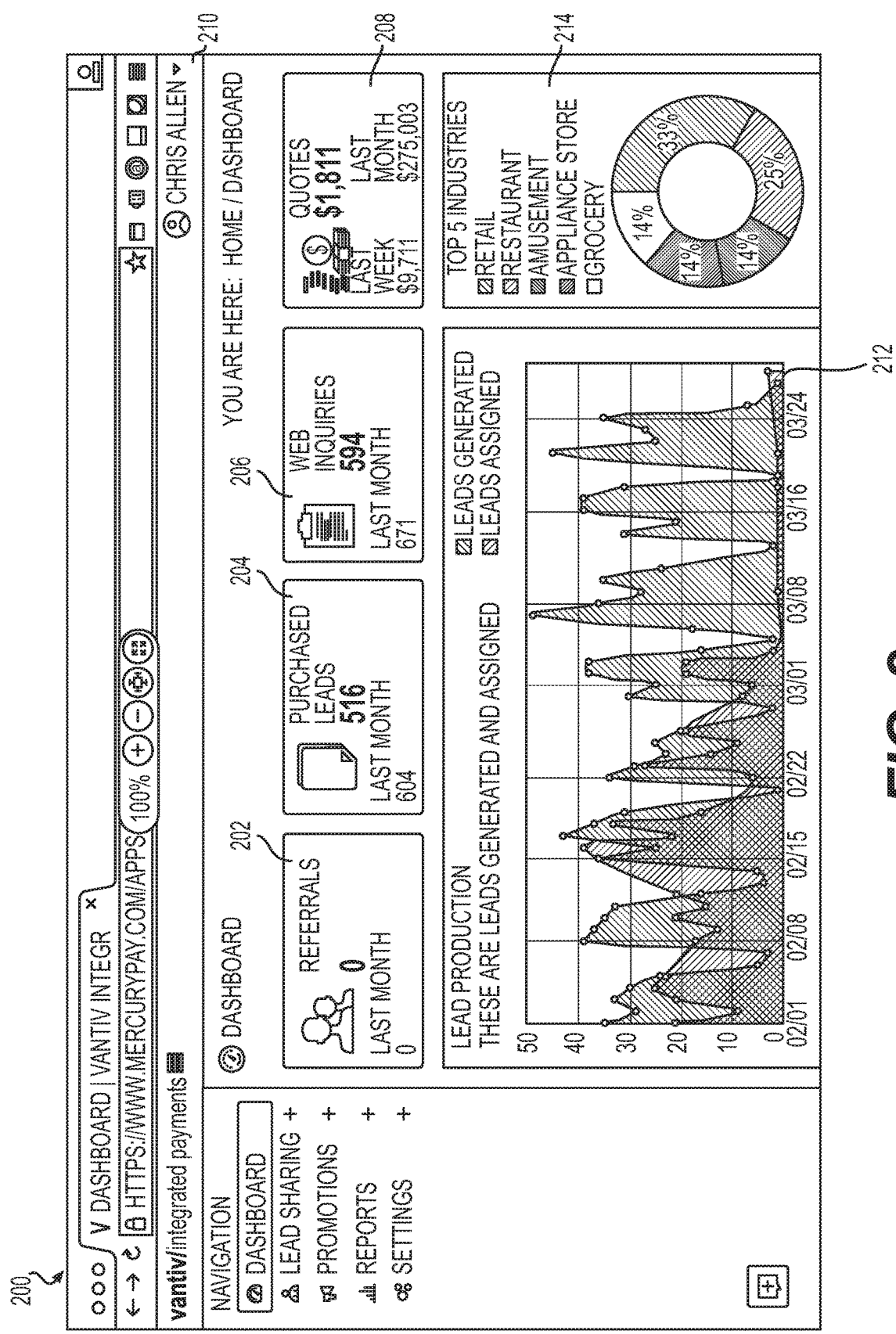
FIG. 2 shows an exemplary view of a graphical user interface dashboard, according to an exemplary embodiment.

FIG. 2 depicts an exemplary view of a graphical user interface showing an embodiment of a dashboard 200 for enabling acquiring bank 102a to evaluate partners such as 116a, 116b, 116c and match partners such as partners 116a, 116b, 116c with one or more new leads, such as new leads 114a, 114b. Dashboard 200 may be an interactive interface tailored to show a summary of information relevant to payments processing network 100, and specifically relevant to the account of a particular user 210. For example, dashboard 200 may show a referrals module 202, a purchased leads module 204, a web inquiries module 206, and a quotes module 208 for a given administrative user 210 associated with acquiring bank 102a, wherein each of the modules 202, 204, 206 and 208 are customized to show information particular to acquiring bank 102a. Dashboard 200 may also show, for example, modules such as an industry summary module 214 and a lead history chart 212. The graphical user interface may be generated by, for example, one or more processors, and may be displayed on one or more local or remote monitors, such as computer monitors, tablet screens, and/or mobile phone screens.

Dashboard 200, and each module displayed on dashboard 200, may be customizable by dashboard user 210 or by, for example, a back-end dashboard manager, such as a web administrator. Dashboard 200 may also be automatically configured by a processor based on known permissions specific to user 210. Dashboard 200 may present a variety of optional modules for display based on the identity of user 210. Multiple different dashboards, each suited to a different user, may automatically be configured and/or generated in parallel.

Data displayed by dashboard 200 (and other embodiments of graphical user interfaces described herein) may be received from, for example, a database containing data about partners 116a, 116b, 116c, merchants 112a, 112b, new merchant leads 114a, 114b, acquiring bank 102a, payment networks 104a, 104b, and/or issuing banks 106a, 106b. Such data may generally include biographical information, such as company names, addresses, contact information, etc., as well as performance history, statistics, and other information relating to the participation of each entity in payments processing network 100.

User 210 depicted in FIG. 2 may be, for example, affiliated with acquiring bank 102a. Alternately, user 210 may be any individual affiliated with an entity in payments processing network 100, such as partner 116a, merchant 112a, new merchant lead 114a, acquiring bank 102a, or issuing bank 106a. For user 210 employed by acquiring bank 102a, referrals module 202 may summarize how many referrals have been made to acquiring bank 102a from a given referral service. User 210 may require an account designed to allow user 210 to sign into the dashboard interface.

For user 210 affiliated with an acquiring bank 102a, the purchased leads module 204 depicted in FIG. 2 may reflect a number of contracts with merchants 112a, 112b and/or new merchant leads 114a, 114b purchased by acquiring bank 102a from another entity, such as a vendor, contractor, advertiser, or any other acquiring bank, such as acquiring bank 102b. The web inquiries module 206 may indicate, for example, the number of web inquiries acquiring bank 102a has received at its website from new merchant leads such as new merchant leads 114a, 114b in a given period of time. The quotes module 208 may reflect overall amounts quoted to potential new merchant leads 114a, 114b.

With respect to a user 210 affiliated with, for example, partner 116a or an acquiring bank 102a, the industry summary module 214 may show, for example, the industries in which user 210 and/or partner 116a has clients. For example, partner 116a may work with leads 112a, 112b in a variety of industries, which may be displayed in the industry summary module 214 as, for example, a pie chart or a list. Also, with respect to user 210 affiliated with partner 116a, the lead history chart 212 may show, for example, a history of leads generated and/or assigned by partner 116a and/or user 210 over a given period of time.

While a variety of modules are depicted in dashboard 200 pictured in FIG. 2, it is to be understood that the modules and their content may vary depending on user 210, the affiliation of user 210 (e.g., with partner 116a, lead 112a or 112b, new lead 114a or 114b, acquiring bank 102a, or issuing bank 106a or 106b), the permissions granted to user 210, and other variables.

Figure 3:
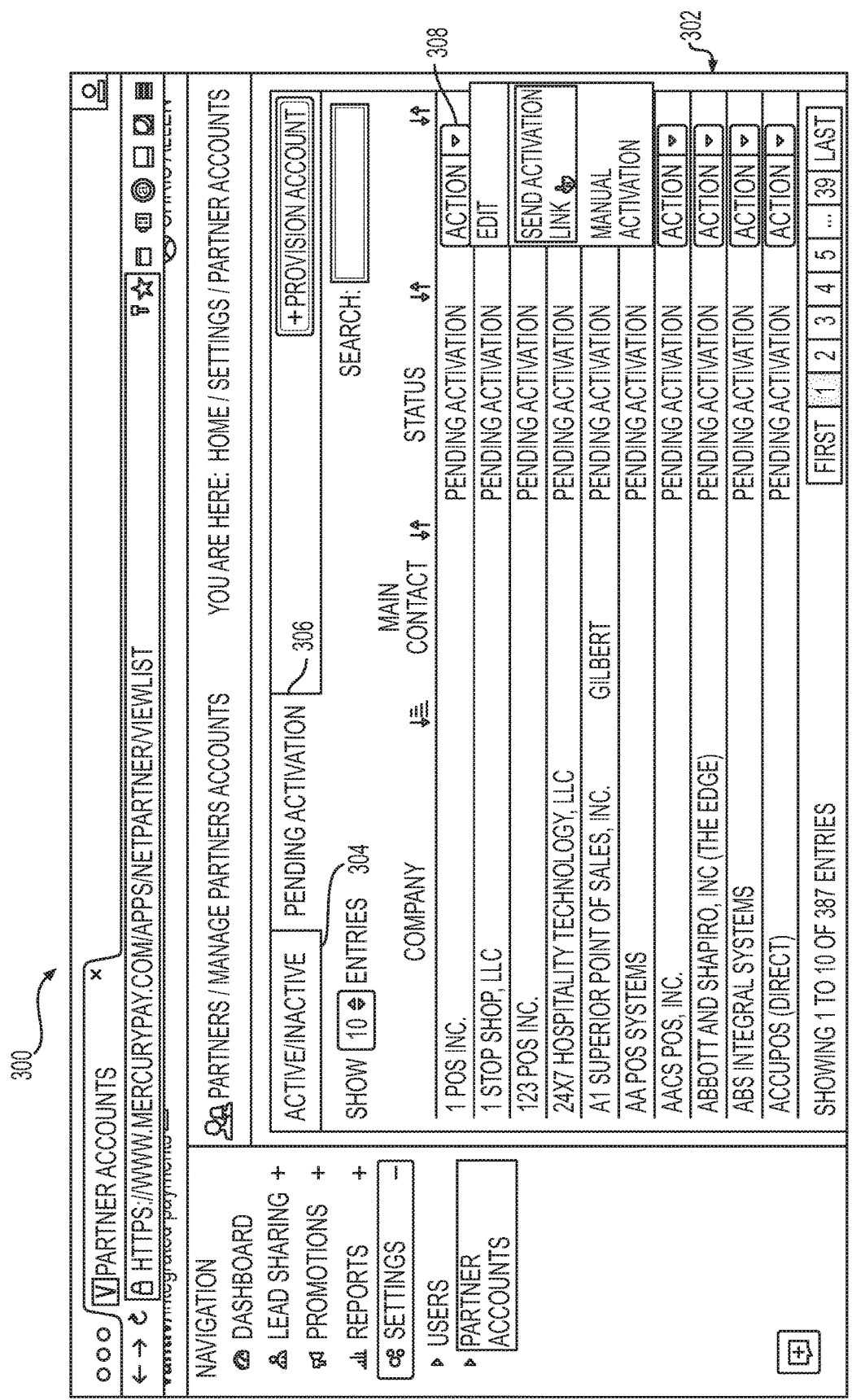
FIG. 3 shows an exemplary view of a graphical user interface providing partner management tools, according to an exemplary embodiment.

FIG. 3 depicts an exemplary view of a partner management user interface 300 providing partner management tools for, e.g., managing partner information, partner status, partner interactions, etc. Partner management user interface 300 may, for example, be accessible via a link from dashboard 200. Partner management user interface 300 may also be tailored to user 210, such as a user affiliated with acquiring bank 102a or merchant 112a. Partner management user interface 300 may display, for example, a partner list 302, which may display a list of partners (e.g., partners 116a, 116b, 116c) by name, contact, and/or status. For example, the partners displayed in the partner list 302 may be all or some of the partners affiliated with the organization of user 210 (e.g., acquiring bank 102a). Each partner in the partner list 302 may be displayed along with, for example, an action selection menu 308, which may allow for the selection of one or more actions relating to the partner. For example, the action selection menu 308 may include an option to edit the partner entry in the partner management user interface, an option to send the listed partner an activation link which the partner may use to change its status, and/or a manual activation option, which may allow the user to manually change the status of the listed partner. The status of the partner may be based, for example, on whether the partner is currently accepting or recruiting new leads (e.g., new leads 114a, 114b) as clients and/or for participation in a partnership with acquiring bank 102a. Partner management user interface 300 may provide options for viewing partners having a particular status; for example, partner management user interface 300 may have an active/inactive tab 304 which may display partners having an active and/or inactive status, and a pending activation tab 306, which may display partners having a "pending activation" status. As with dashboard 200, the information displayed on partner management user interface 300, such as the listing of partners and/or the permissions to edit partner entry information on the partner management user interface 300 may vary with the identity of user 210 for which partner management user interface 300 is generated.

Figure 4:
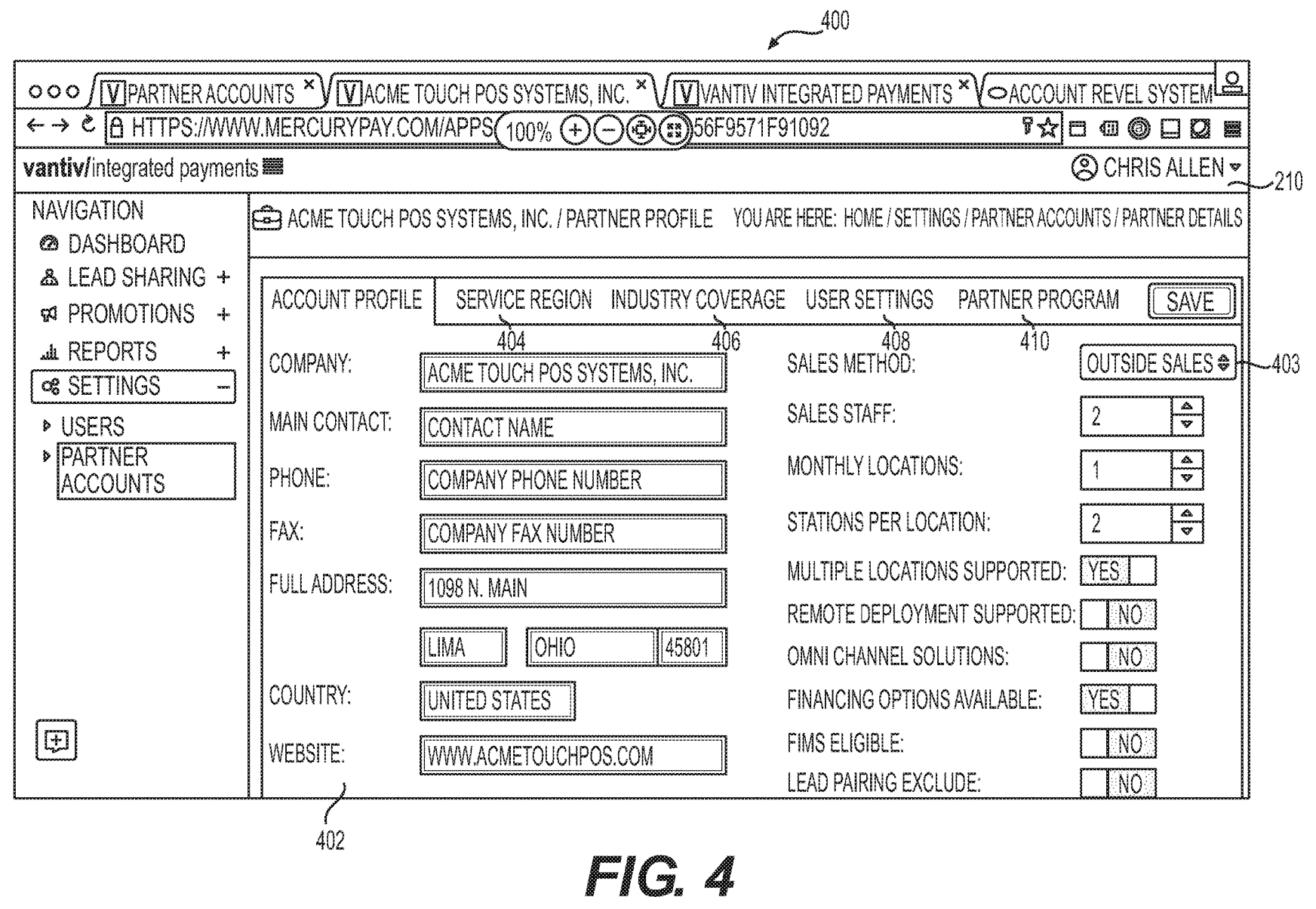

FIG. 4 depicts an exemplary view of a partner details user interface 400 for viewing and managing details about a partner, such as partners 116a, 116b, 116c. Partner details user interface 400 may, for example, be accessible by clicking on the name of a partner in partner management user interface 300. Partner details user interface 400 may include a plurality of selectable tabs, including a partner account profile tab 402, a service region tab 404, an industry coverage tab 406, a user settings tab 408, and a partner program tab 410.

Partner account profile tab 402 may include details associated with a partner, such as the partner name, main contact name, phone number, fax number, address, website, etc. Partner account profile tab 402 may also show a sales method 403, which may be the method by which the partner associated with the partner account accomplishes sales. For example, partner 116a may accomplish outside sales, in which case sales method 403 will reflect that partner 116a accomplishes outside sales. Partner account profile tab 402 may also list the number of sales staff associated with the partner account. Partner account profile tab 402 may also list the number of monthly locations at which the partner appears if, for example, the partner makes periodic appearances at a variety of locations. Alternately, partner account profile tab 402 may specify that the partner has a permanent business location. Partner account profile tab 402 may provide further details about the partner, such as whether the partner supports multiple locations, whether the partner supports deployment to a remote lead, whether the partner participates in optional programs, and whether the partner should be excluded from a lead pairing process. Depending on the permissions of user 210, the information viewable in partner account profile tab 402 may be editable by user 210.

Figure 5:
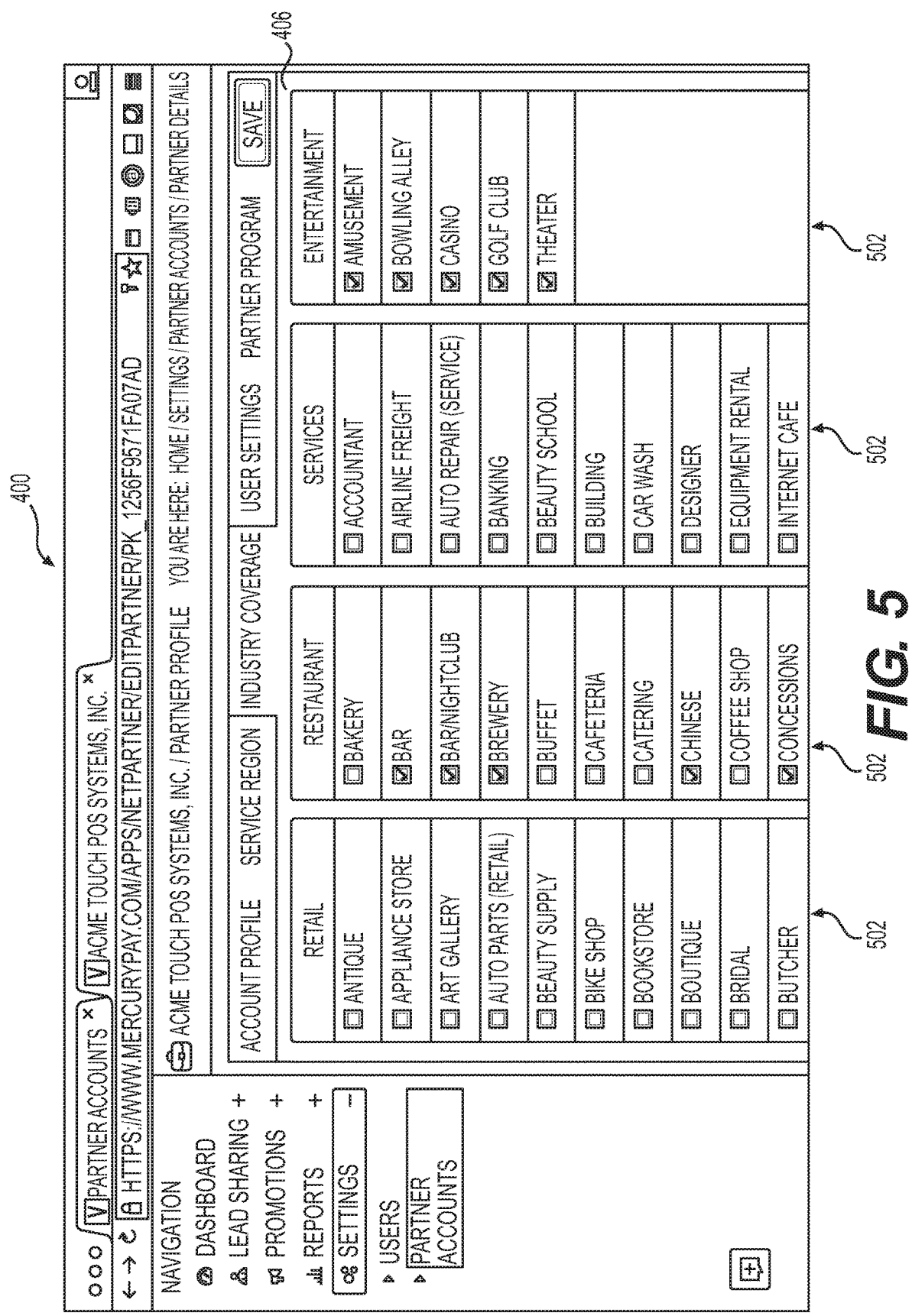
FIG. 5 shows another exemplary view of a graphical user interface providing further partner details, according to an exemplary embodiment.

FIG. 5 depicts another exemplary view of a partner details user interface 400, displaying industry coverage tab 406. Upon being selected, industry coverage tab 406 may display a plurality of industry categories 502, which may each contain a plurality of selectable industry subcategories corresponding to industries in which one or more merchants (e.g., merchants 112a, 112b) or potential new leads (e.g., new merchant leads 114a, 114b) operate. If a subcategory is selected using, for example, the check box next to the subcategory name, that may indicate that the partner is or has been paired with a merchant in that industry subcategory, and/or that the partner has particular capabilities or specialties relating to that industry subcategory. Depending on the permissions of user 210, the information viewable in partner account profile tab 402 may be editable by user 210.

Figure 6:
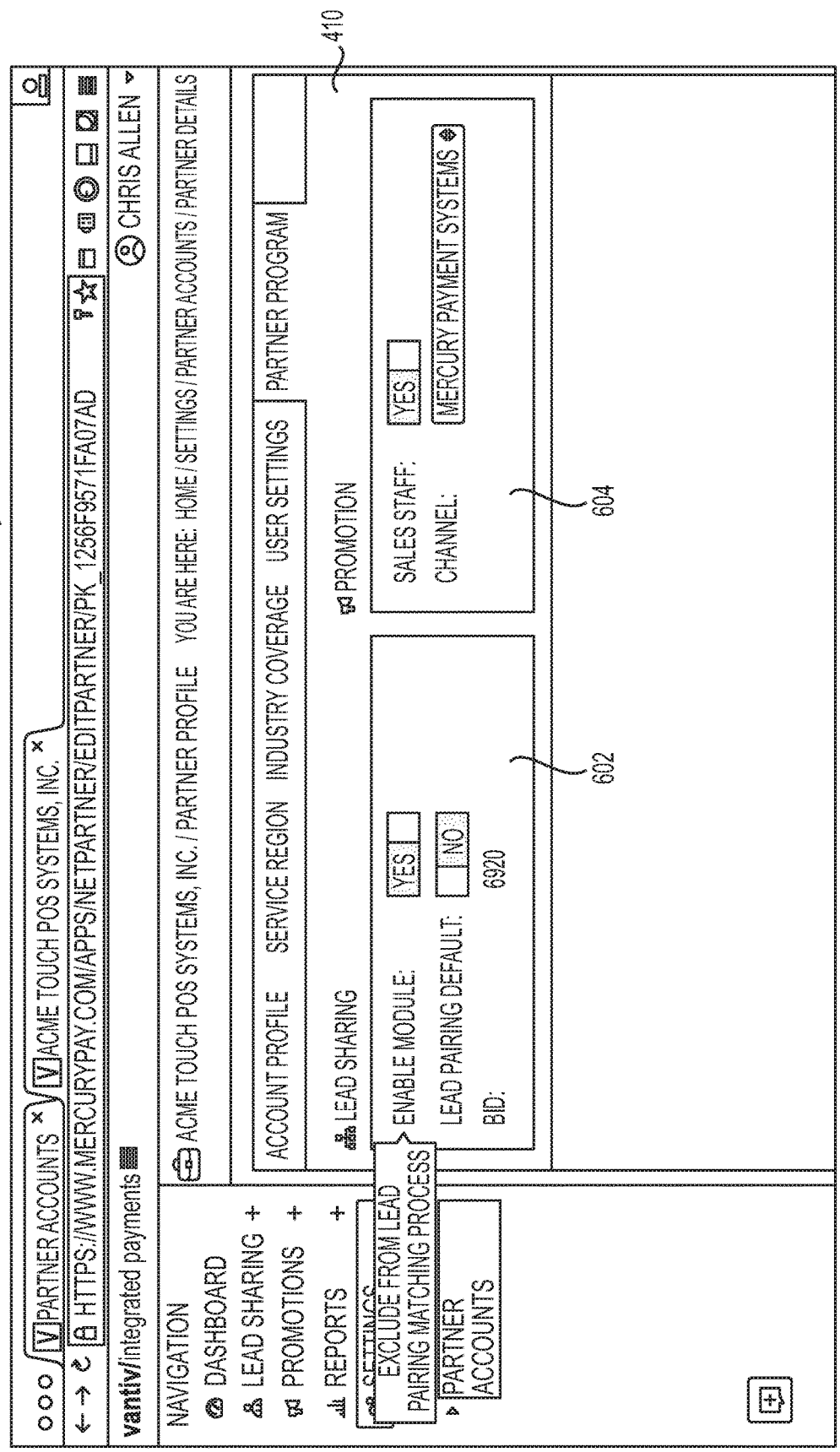
FIG. 6 shows another exemplary view of a graphical user interface providing further partner details, according to an exemplary embodiment.

FIG. 6 depicts another exemplary view of partner details user interface 400, displaying partner program tab 410. Upon being selected, and for some users 210 (such as, for example, users affiliated with acquiring bank 102a), partner program tab 410 may display modules relating to the process of pairing partners such as partners 116a, 116b, 116c with new leads such as new leads 114a, 114b. For example, partner program tab 410 may include a lead sharing module 602, which may include an option to enable the lead sharing module and an option to set the default status for pairing a partner, such as partner 116c with a new lead, such as new lead 114a (e.g., a default status of "no" indicates that the partner 116c is not to be included as an option for pairing with new lead 114a, by default). Partner program tab 410 may also include, for example, a promotions module 604, which may include an option for specifying that sales staff of the partner participate in one or more promotion programs, and a promotions channel through which promotions programs may be managed for the partner.

FIG. 7 depicts an exemplary view of a lead management user interface 700 for depicting a plurality of new leads (e.g., new leads 114a, 114b) and/or merchants (e.g., merchants 112a, 112b), and information about them. Lead management user interface 700 may be accessible, for example, via a link from dashboard 200. Lead management user interface 700 may include a plurality of tabs including, for example, a new leads tab 702, a "my leads" tab 704, an "all leads" tab 706 and a search function 708. The new leads tab 702 may include a list of new leads 710, which may include details about each new lead such as the date the lead was entered into the list, the lead source, the contact person at the lead, the company name, and the location of the lead. The list 710 may further include a "manage" link for each new lead in the list which, upon selection, may allow for the entry or editing of details for each new lead.

As with the prior graphical user interfaces discussed above, lead management user interface 700 may show more or less content depending on the identity and/or affiliations of user 210 for which lead management user interface 700 is generated, and may allow or disallow editing of the content displayed on lead management user interface 700 depending on permissions granted to user 210. For example, a lead management user interface designed for a user employed by partner 116a may display only a list of new leads 710 which may potentially be paired with partner 116a. Alternately, a lead management user interface designed for a user employed by a partner 116a may not display a new leads tab 702 or an "all leads" tab 706, and may instead only show the "my leads" tab 704.

Figure 8:
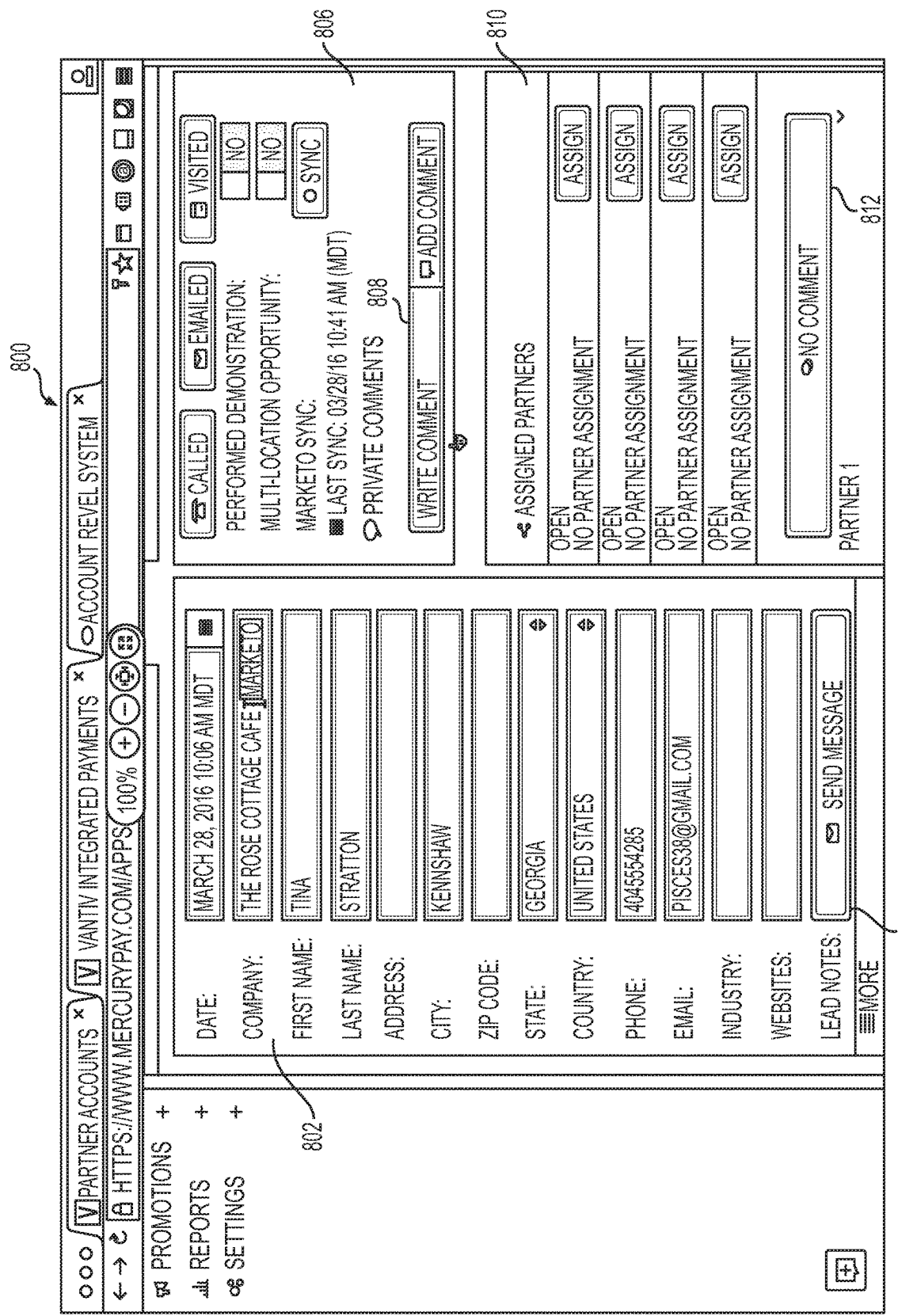
FIG. 8 shows an exemplary view of a graphical user interface providing lead details, according to an exemplary embodiment.

FIG. 8 depicts an exemplary view of a lead details user interface 800, showing the details pertaining to a given merchant (e.g., merchant 112a, 112b) or new lead (e.g., new lead 114a, 114b). Lead details user interface 800 may be accessible, for example, via a link from a lead entry in the new leads list 710. Lead details user interface 800 may include a lead biography module 802, an interactions module 806, and an assigned partners module 810.

Lead biography module 810 may contain, for example, identification details for the merchant or new lead of interest including, for example, the date the merchant or new lead was entered, its company name, the name of its contact person, the address, email, and website address of the merchant or new lead. Lead biography module 810 may also include a message link, which may lead to an electronic form in which a message can be typed to the merchant, new lead, or a contact person associated with the merchant or new lead. The interactions module 806 may include a set of markers to indicate whether the merchant or new lead has been called, emailed, or visited, whether the merchant or new lead has received a demonstration, whether the merchant or new lead is a multi-location opportunity, and whether the lead systems have been synchronized to services provided by a partner. Interactions module 806 may also include a private comments section 808, in which comments regarding interactions with the merchant or new lead can be recorded. Assigned partners module 810 may include several fields in which partners assigned thus far to the merchant or new lead may be specified. Assigned partner module 810 may further include a comment section 812, in which comments about partner assignments may be kept.

Figure 9:
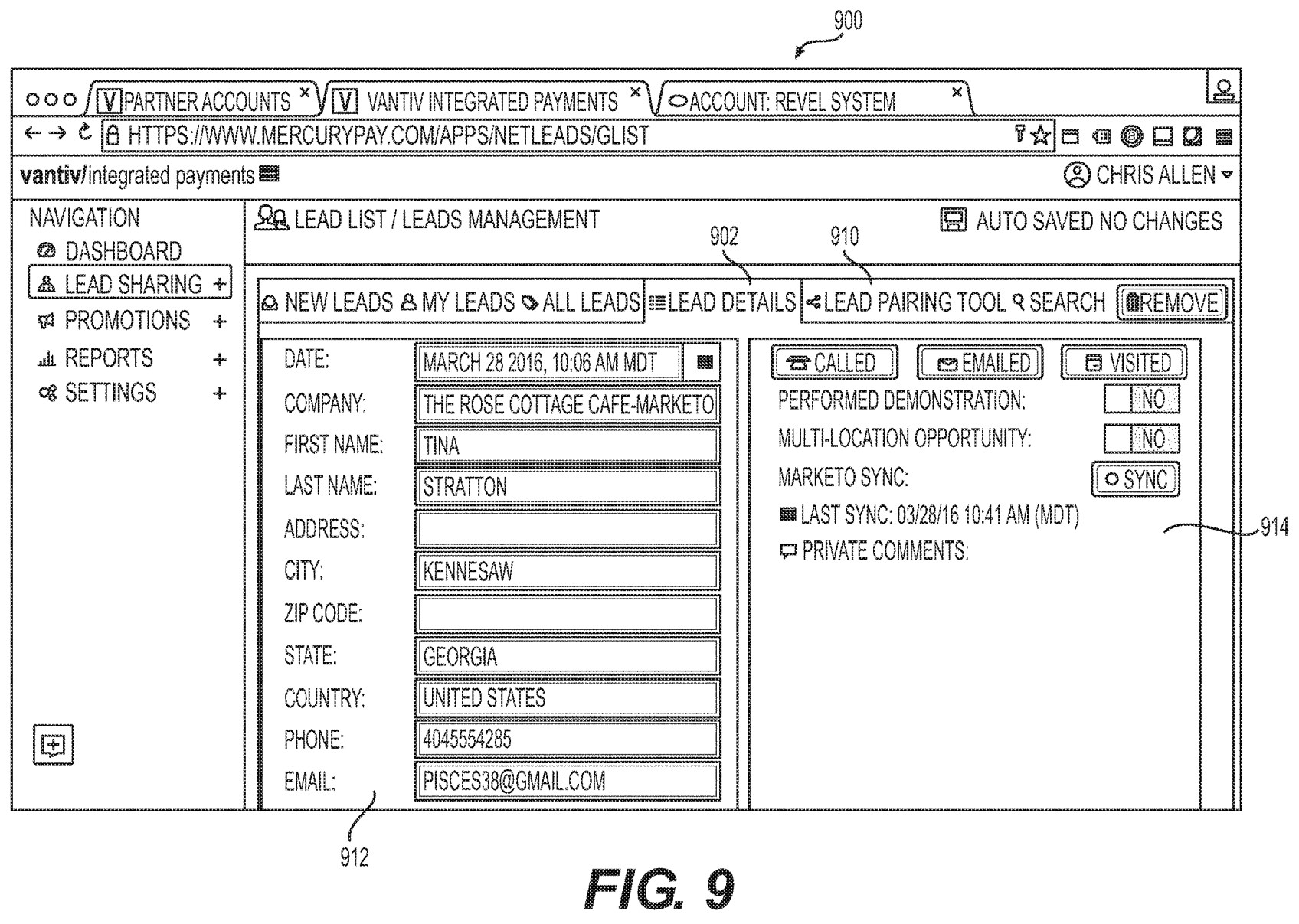

FIG. 9 depicts an alternate version of a lead management user interface 900 for managing details of a merchant (e.g., merchant 112a, 112b) or new lead (e.g., new lead 114a, 114b). In this embodiment, a lead details tab 902 may be another tab adjacent to tabs similar to those that were depicted in lead management user interface 700. Lead details tab 902 may include a lead biography module 912 listing, for example, the date, name, contact name, address, phone number, and email address of the merchant or new lead. Lead details tab 902 may also include a lead interactions module 914, having a set of markers similar to those in interactions model 806 represented in FIG. 8.

Figure 10:
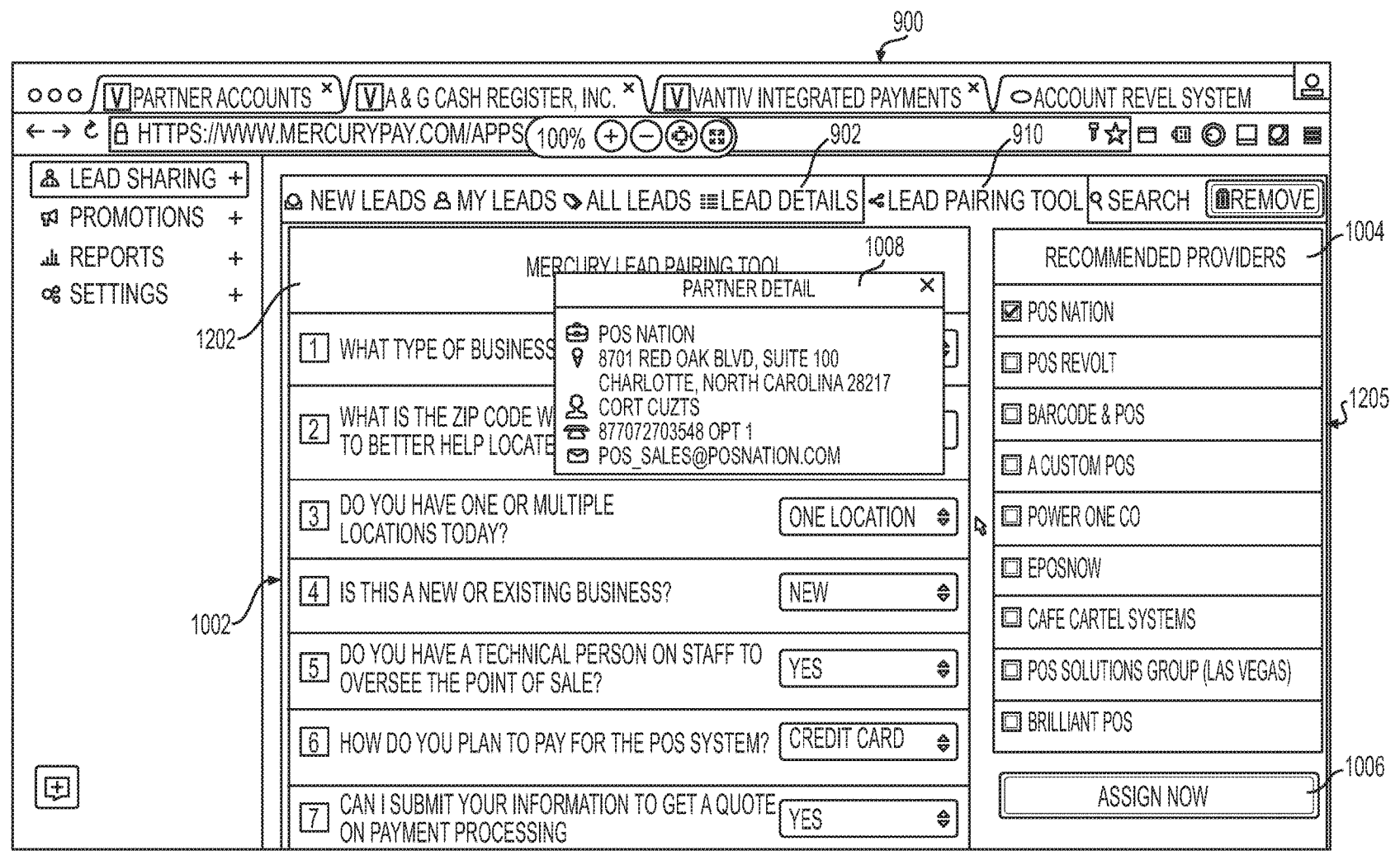

FIG. 10 depicts an embodiment in which lead management user interface 900 may further have a lead pairing tool tab 910. In the case of a new lead (e.g., new lead 114a, 114b), the lead pairing tool tab 910 may include the display of a lead pairing questionnaire 1002, which may contain a list of questions that have been, or will be, directed to a new lead via, for example, a new lead user interface (see FIG. 11). Lead pairing tool tab 910 may also include a recommended providers list 1004, which may display a list of selectable potential partners 116 that may be suitable for pairing with the new lead 114, and which may change depending on one or more answers to questionnaire 1002 received from the new lead. Recommended providers list 1004 may include an assignment button 1006. A partner detail window 1008 may be viewable upon mousing over or otherwise indicating a partner in the recommended providers list 1004. Upon one or more potential partners being selected and the assignment button 1006 being pressed, the one or more selected potential partners may be paired with the new lead. Upon such a new pairing, the partner and/or the new lead may be sent contact information and other details to allow the partner to begin assisting the new lead with merchant boarding and other electronic payments processing-oriented services.

FIG. 11 depicts a new lead user interface 1100 displaying questionnaire 1002. New lead user interface 1100 may be viewable to a new lead 114 on an electronic screen, such as a computer monitor, mobile phone screen, or tablet screen. New lead user interface 1100 may be generated at a remote processor, such as a processor operated by an acquiring bank (e.g., acquiring bank 102a), and may be transmitted to a new lead over an electronic network, such as the Internet. Questionnaire 1002 may be populated with a series of questions having a plurality of selectable answers, e.g., 1102, 1106, 1108, 1110, and/or fillable answer fields 1104. Questionnaire 1002 may also have a submission button 1112, which may submit questionnaire 1002 with the provided answers.

Questionnaire 1002 may generally include any questions that may assist in automatically identifying a partner that is suited to being paired with the new lead. For example, the questions in questionnaire 1002 may be directed to biographical information about the new lead, such as the new lead's business type, location, number of locations, and age of business. The questions may also be directed to the new lead's method of doing business, such as whether the new lead has a technical person on staff to oversee the point of sale (POS), how the new lead plans on paying for a POS system, whether the new lead would like a quote on payment processing and gift cards, and whether the new lead prefers a mobile tablet POS as opposed to, for example, a desktop POS or POS with a wired connection.

FIG. 12 depicts a schematic diagram of an algorithm 1200 executed by a matching engine, such as matching engine 156 shown in FIG. 1B, to pair partners (e.g., partners 116a, 116b, 116c) with new leads (e.g., new leads 114a, 114b). Algorithm 1200 may be used to narrow down a list of potential partners for pairing with one or more new leads, based on either answers to questionnaire 1002 received from the one or more new leads and/or based on other parameters that may render a potential partner suitable for pairing with a new lead. According to a first step 1204, a list of potential partners 1202 may be received. The list 1202 may be based, for example, on eligible accounts. Eligible accounts may be the accounts of partners which are active (i.e., currently accepting pairings with new leads), and which have not been paired with a new lead in a specified period of time, such as an hour, day, etc. According to a second step 1206, list 1202 may be narrowed by, for example, removal of partners that do not meet a certain threshold, such as a threshold of lead recruitment success or a threshold approval rating received from merchants (e.g., merchants 112a, 112b). According to a next step 1208, list 1202 may be further narrowed by, for example, removal of partners that are not a geographical match with the new lead. According to a next step 1210, the list 1202 may be further narrowed by, for example, removal of partners that do not provide vertical coverage in the area of business of the new lead. For example, if the new lead is a bar, then partners that do not provide service to (or specialize in service to) food and beverage service business may be removed from list 1202. According to a next step 1212, list 1202 may be sorted in an order of preference by, for example, the percentage 1214 of new lead accounts closed or won by each partner in list 1202.

As will be apparent to one of ordinary skill in the art, the criteria by which list 1202 may be narrowed may occur in the above-described order, but may also occur in any other suitable order for identifying partners eligible to be paired with new leads. In some embodiments, some criteria may be prioritized over others, e.g., based on priorities expressed by a new lead, partner, or acquiring bank. For example, in some embodiments, a narrowing step 1210 by vertical coverage may be performed before the narrowing step 1208 by geographical match.

Moreover, as will be apparent to one of ordinary skill in the art, the narrowing criteria depicted in FIG. 12 are not exhaustive. Other narrowing criteria may be applied to list 1202 of potential partners in addition to, or instead of, the criteria shown in FIG. 12. For example, list 1202 may be narrowed by removing, e.g., partners that do not provide a given service that a new lead needs, such as tablet-based POS terminals instead of desktop-based POS terminals. Other examples of narrowing criteria, or criteria by which potential partners may be sorted, include the number of service staff available at potential partners, the relative physical distance between the new lead and the potential partners, and/or the current capacity for new leads that each potential partner has. Other narrowing criteria may be ascertained by those of ordinary skill in the art, and may be added to or substituted into algorithm 1200.

Figure 13:
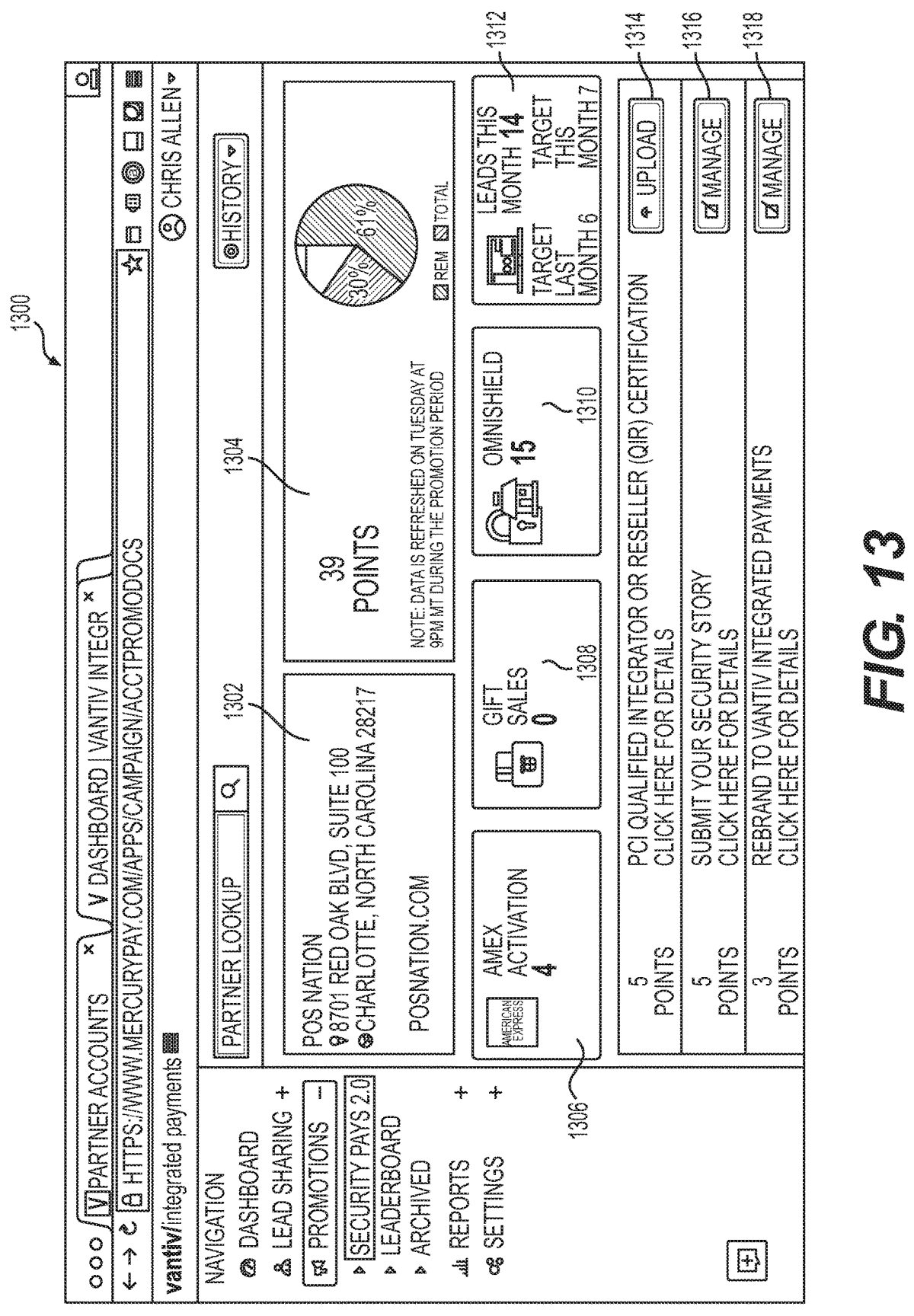

FIG. 13 depicts other aspects of a graphical user interface relating to services between partners, merchants and/or new leads, according to some embodiments of this disclosure. Specifically, FIG. 13 depicts a promotions detail interface 1300, which may display a partner identity module 1302 and a points module 1304 for a partner identified in the partner module 1302. The promotions detail interface may also show a variety of promotion performance modules, such as a card activation module 1306, a gift sales module 1308, a security promotions module 1310, and a target/achieved leads module 1312. The promotions detail interface 1300 may also display options for submitting promotions materials, such as a certification submission option 1314, a promotional story submissions option 1316, and a rebranding submission option 1318. Promotions may be geared towards specific goals, such as increasing the participation of partners and merchants in enhanced payments processing security programs. Partners may earn points for completing, participating in, and/or encouraging merchants and/or new leads to participate in, various promotions which may be reflected on the promotions detail interface 1300. Points earned may be stored in a database or server along with other information about partners, new leads, and other entities in payment processing network 100. The points gained by partners may be a further criterion by which partners are sorted in algorithm 1200 depicted in FIG. 12, or in the methods described in FIGS. 16 and/or 17 below.

Figure 14:
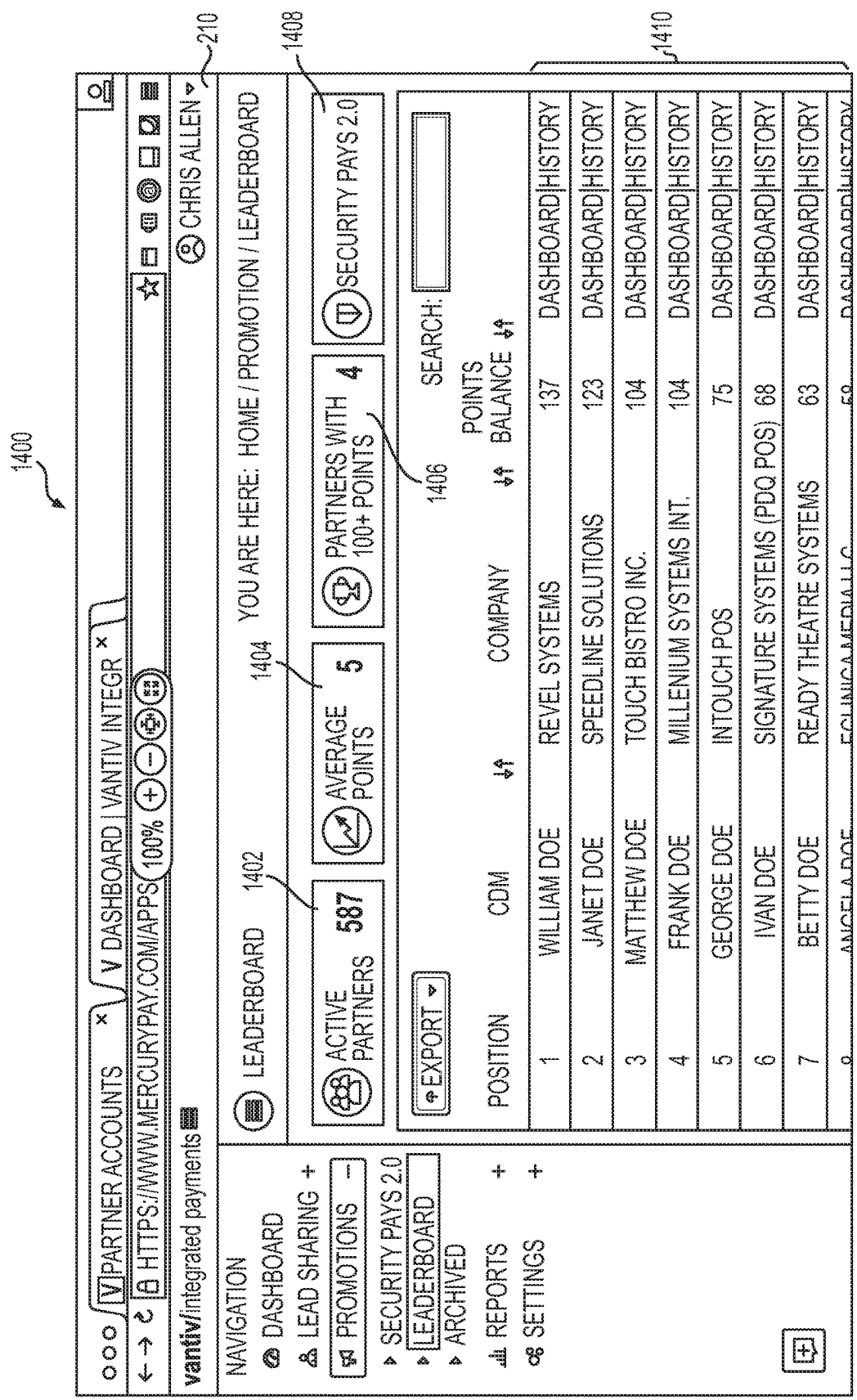
FIG. 14 shows an exemplary view of a graphical user interface providing a summary of partner performance, according to an exemplary embodiment.

FIG. 14 depicts a graphical user interface showing a promotions leaderboard 1400, which may show summaries of partner performance and point accumulation with regard to, for example, promotions, such as the promotions detailed in promotions detail interface 1300. The promotions leaderboard may include, for example, an active partners summary 1402, an average points summary 1404, a top partners summary 1404, and a security promotions summary 1408. The promotions leaderboard 1400 may include a list of partners 1410, which may be sortable by, for example, individual name, company name, and/or points balance.

FIG. 15 shows further aspects of a graphical user interface according to some embodiments of this disclosure. A user settings interface 1500 is depicted, which may show a user list 1502 of users which may have access to one or more of the above-described graphical user interfaces.

Depending on the account of user 210 viewing user settings interface 1500, promotions leaderboard 1400, promotions detail interface 1300 and/or other embodiments of interfaces disclosed herein, the interfaces may allow more or less information to be shown. Further, and depending on the account and permissions of user 210, the information for each user in the user list 1502 may be editable.

Figure 16:
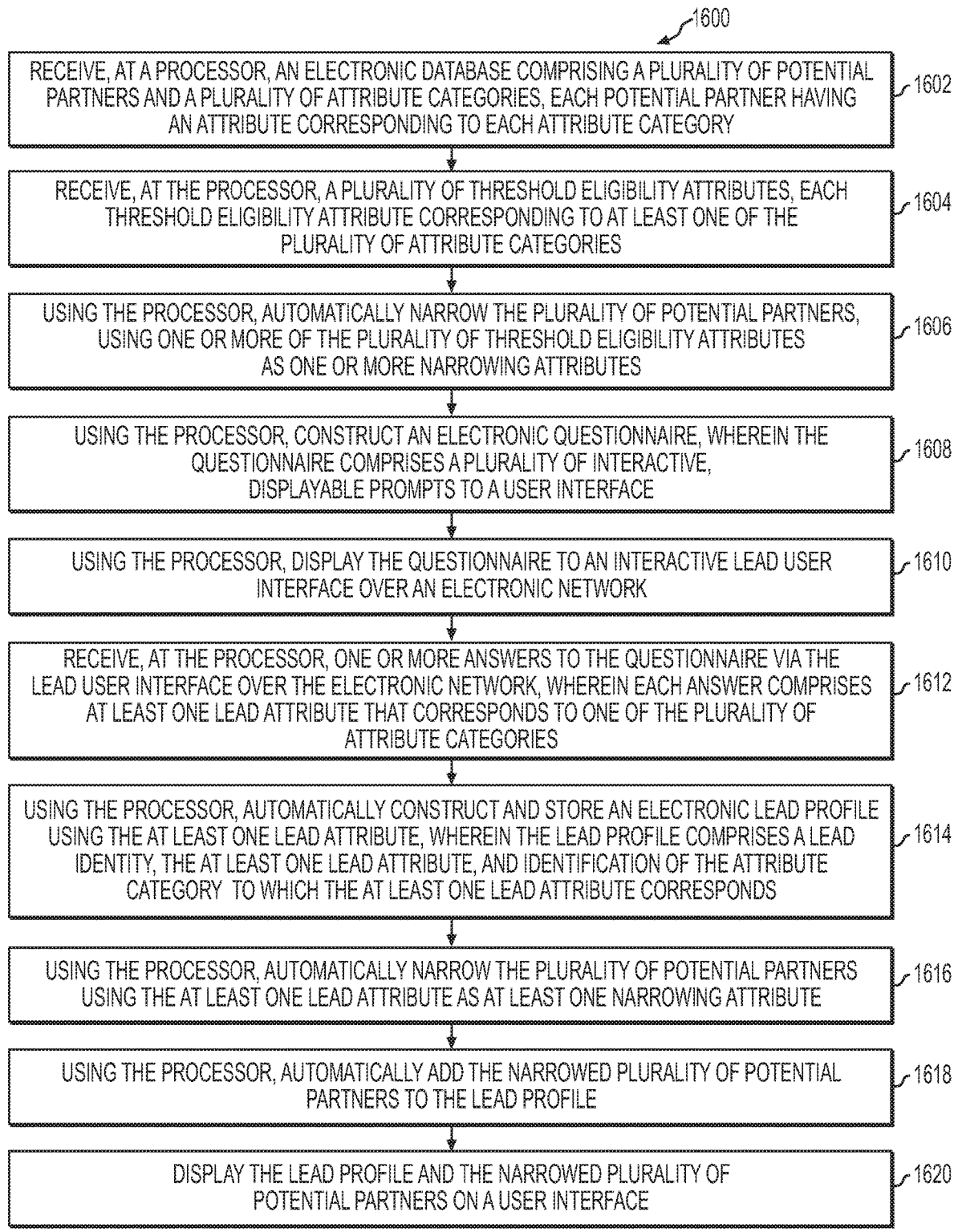
FIG. 16 is a block diagram of a method for generating and presenting a graphical user interface showing a subset of a plurality of potential partners for a given lead, according to an exemplary embodiment.
Figure 17:
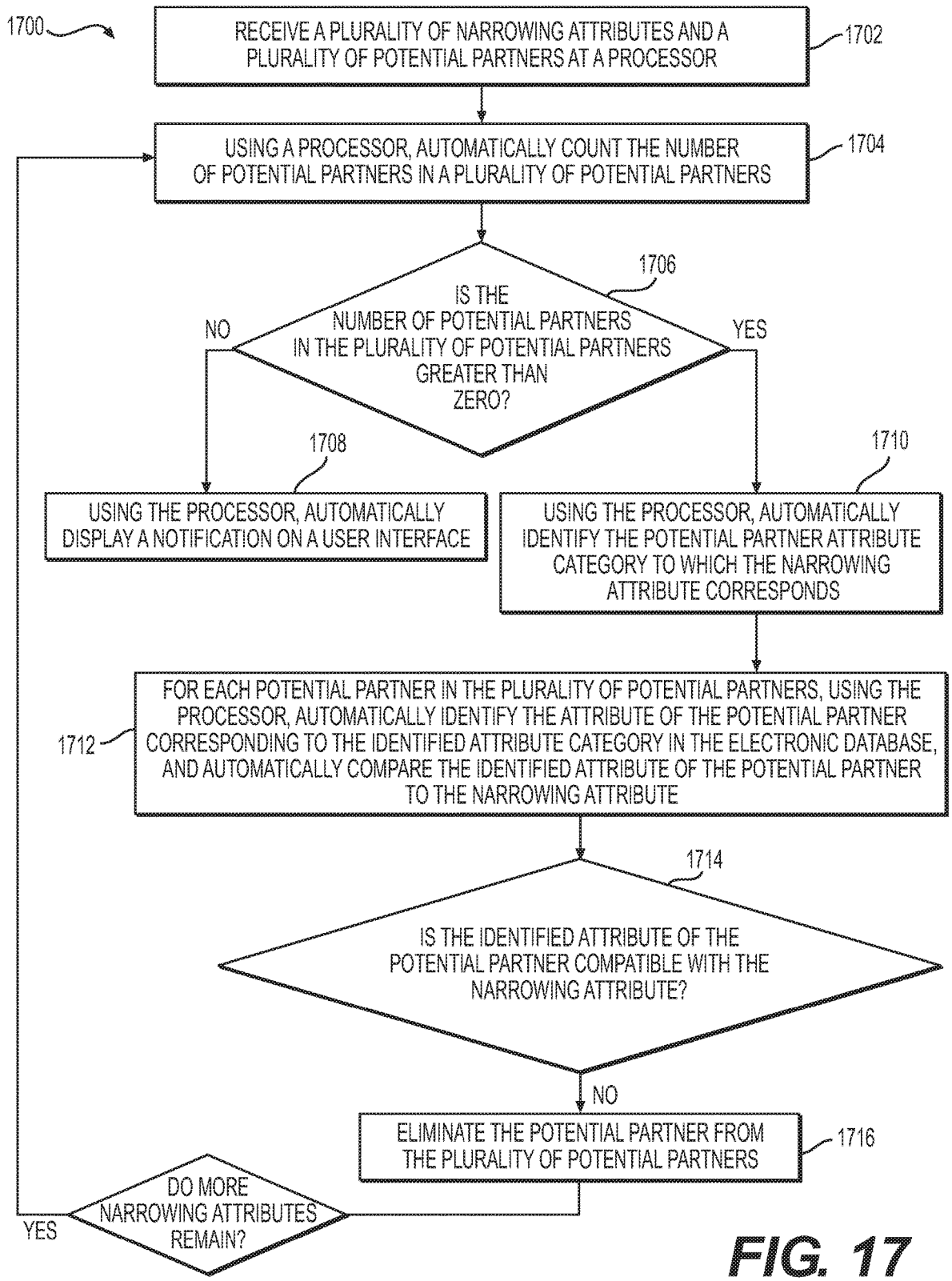
FIG. 17 is a block diagram of a method for assisting in generating and presenting a graphical user interface showing a subset of a plurality of potential partners for a given lead, according to an exemplary embodiment.

FIGS. 16 and 17 relate generally to methods of generating and displaying a plurality of potential partners (such as partners 116*a*, 116*b*, 116*c*) for pairing with new leads (such as new leads 114*a*, 114*b*) using, e.g., the embodiments of graphical user interfaces described above, such as (but not limited to) lead management user interfaces 700, 900, and new lead user interface 1100.

Specifically, FIG. 16 depicts a selection method 1600 of selecting and displaying a narrowed plurality of potential partners to pair with a new lead. According to step 1602, an electronic database comprising a plurality of potential partners and a plurality of attribute categories may be received at a processor, each potential partner having an attribute corresponding to each attribute category. This received database may be, for example, a database from which data is taken to generate one or more user interfaces described above. The plurality of potential partners may be a plurality of partners including, for example, one or more of partners 116*a*, 116*b*, 116*c*, such as a potential partner list 1202, as depicted in FIG. 12. The plurality of attribute categories may include categories of biographical and other information about the plurality of potential partners and/or merchants already paired with each of the plurality of potential partners, that may affect whether a potential partner should be paired with a new lead, such as partner status (active or inactive), partner location, capacity for new pairings, types of businesses served, company sizes of paired merchants, number of partner locations, number of partner staff members, prior success in completing merchant boarding with merchants, prior satisfaction ratings from merchants, and types of services provided by each of the plurality of partners (e.g., POS terminal servicing, gift card services, security services, etc.). Further attribute categories may cover any information that may be relevant to pairing each of the plurality of potential partners with one or more new leads.

According to step 1604, a plurality of threshold eligibility attributes may be received at the processor, each threshold eligibility attribute corresponding to at least one of the plurality of attribute categories. The plurality of threshold eligibility attributes may be attributes used to initially remove potential partners from the plurality of partners that may generally not be willing or able to pair with new leads. In some embodiments, the threshold eligibility attributes may be, for example, some or all of the partner criteria discussed with respect to algorithm 1200 depicted in FIG. 12. In alternate embodiments, the threshold eligibility attributes may include information that affects the eligibility of partners independently of the identity of any new leads, such as partner capacity for being paired with new leads, prior success in completing merchant boarding with prior paired leads, i.e., merchants, and/or satisfaction ratings provided by prior paired merchants.

According to step 1606, the processor may be used to automatically narrow the plurality of potential partners using one or more of the plurality of threshold eligibility attributes as one or more narrowing attributes (according to, for example, the steps depicted in FIG. 17). In some embodiments, the processor may first prioritize the plurality of threshold eligibility attributes in a particular order of priority, based on, for example, which threshold eligibility attributes are most important to a new lead. In such embodiments, the narrowing step 1606 may narrow the plurality of potential partners using the threshold eligibility attributes in their order of priority.

According to step 1608, the processor may be used to construct an electronic questionnaire, wherein the questionnaire comprises a plurality of interactive, displayable prompts to a graphical user interface. This questionnaire may be, for example, a questionnaire such as questionnaire 1002 depicted in FIGS. 10 and 11. The questionnaire may be, for example, constructed of questions prompting a new lead (such as new leads 114*a*, 114*b*) to provide information useful to pairing the new lead with one or more partners (such as partners 116*a*, 116*b*, 116*c*). In some embodiments, for example, the questionnaire may be pre-constructed prior to any information being received about a new lead. In alternate embodiments, the questionnaire may be constructed after information about a new lead has been received, e.g., through a prior electronic or written form submitted by the new lead. In such embodiments, the questionnaire may be, for example, constructed of only questions to which a given database having data on the new lead does not have answers.

According to step 1610, the processor may be used to transmit the questionnaire to an interactive lead user interface over an electronic network. In some embodiments, the interactive lead user interface may be, for example, an interface such as lead user interface 1100 depicted in FIG. 11. In alternate embodiments, the lead user interface may not be separate from a general dashboard 200 or lead management user interface 900, depicted in FIG. 10.

According to step 1612, one or more answers may be received from the lead user interface, over the electronic network, and at the processor, wherein each answer comprises at least one lead attribute that corresponds to one of the plurality of attribute categories. For example, a new lead may complete one or more answers to questionnaire 1002 on, e.g., lead user interface 1100, and may submit the questionnaire by selecting submission button 1112, at which point questionnaire 1002 and answers may be received by the processor. Lead attributes may include any biographical or other information about the new lead, as has been described previously herein. Such biographical or other information (such as location, age, size of company, etc.) may correspond to one or more of the plurality of attribute categories.

According to step 1614, the processor may be used to automatically construct and store an electronic lead profile using the at least one lead attribute, wherein the lead profile comprises a lead identity, the at least one lead attribute, and identification of the attribute category to which the at least one lead attribute corresponds. Such an electronic lead profile may be created and stored in a database, or may be displayed on, for example, a graphical user interface, such as lead details interface 800 depicted in FIG. 8, lead management interface 900 depicted in FIG. 9, or both. In some embodiments, if prior information has already been collected regarding a new lead, a partial lead profile may already exist in one or more electronic databases. In such embodiments, the partial lead profile may be supplemented using the at least one lead attribute received. In alternative embodiments, a full lead profile may already exist; in such embodiments, this step 1614 may optionally not be performed.

According to step 1616, the processor may be used to automatically narrow the plurality of potential partners using the at least one lead attribute as at least one narrowing attribute (according to, for example, the steps depicted in FIG. 17). In embodiments where more than one lead attribute is used, the processor may optionally be used to sort the lead attributes in an order of importance, e.g., based on which lead attribute should be considered the highest priority in pairing a potential partner with a new lead. In such embodiments, the narrowing step 1616 may narrow the plurality of potential partners using the lead attributes in their order of importance.

According to step 1618, the processor may be used to automatically add the narrowed plurality of potential partners to the lead profile as, for example, a database entry or plurality of entries associated with the rest of the lead profile.

According to step 1620, the lead profile and narrowed plurality of potential partners may be displayed on a graphical user interface. For example, in some embodiments, the lead profile and narrowed plurality of potential partners may be displayed on lead management interface 900 under lead pairing tool tab 910, as depicted in FIG. 10. In some embodiments, the narrowed plurality of potential partners may be displayed in a selectable list, such that a user viewing the graphical user interface may select one or more partners and pair them with a new lead. In some embodiments, as depicted in FIG. 10, partner detail window 1008 may be viewable for each of the potential partners in the narrowed plurality of potential partners, to potentially assist a user in making a final selection of a potential partner to pair with a new lead. In alternate embodiments, the processor may further automatically select one or more of the narrowed plurality of potential partners to be paired with a new lead. In such embodiments, the processor may automatically send a notification to the selected partner, the new lead, both, and/or a representative of either or both to notify them of the selection.

FIG. 17 displays sub-steps in an automatic narrowing process 1700 that may be used to narrow a plurality of potential partners based on narrowing attributes. For example, narrowing process 1700 may be used to accomplish narrowing steps 1606, 1616 (shown in FIG. 16) in method 1600. According to a step 1702, a plurality of narrowing attributes and a plurality of potential partners may be received at a processor. The plurality of narrowing attributes may be, for example, a plurality of threshold eligibility attributes received according to step 1604 in method 1600, or may be lead attributes received according to step 1612 in method 1600. In some embodiments, the plurality of narrowing attributes may be received in an order of priority. In alternate embodiments, the narrowing process 1700 may be done with a single narrowing attribute.

Steps 1704 and onwards may be completed for each received narrowing attribute, and may be repeated for as many narrowing attributes as are received in the plurality of narrowing attributes. In embodiments in which the plurality of narrowing attributes have been received in an order of priority, step 1704 and onwards may be completed for each received narrowing attribute in the order of priority that the narrowing attributes were received in.

According to a step 1704, the processor may be used to automatically count the number of potential partners in the plurality of potential partners. According to a step 1706, a processor may be used to determine whether the number of potential partners in the plurality of potential partners is greater than zero. If it is not, then according to step 1708, the processor may be used to automatically display a notification on a graphical user interface. Such a notification may state, for example, that no potential partners are compatible with all of the narrowing attributes provided. In that case, because there are no potential partners to be sorted in the plurality of potential partners, the narrowing process 1700 may end here.

In an alternate embodiment, the processor may be used to determine whether the number of potential partners in the plurality of potential partners is greater than one. In such an embodiment, and if only one potential partner remains in the plurality of potential partners, then as a part of displaying a notification according to step 1708, the processor may identify the single potential partner in the plurality of potential partners, and indicate that the single potential partner is compatible with the most narrowing attributes out of the full plurality of potential partners. In further alternate embodiments, the processor may be used to determine whether the number of potential partners in the plurality of potential partners is greater than two, three, or any other number. In such alternate embodiments, as a part of displaying a notification according to step 1708, the processor may identify the two, three, or other number of potential partners in the plurality of potential partners in the display.

If, according to step 1706, the number of potential partners in the plurality of potential partners is greater than zero, then according to a step 1710, the processor may be used to automatically identify the potential partner attribute category to which the narrowing attribute corresponds. For example, the processor may be used to identify which attribute category in the plurality of attribute categories in the database received according to step 1602 the narrowing attribute belongs. For example, the processor may be used to identify whether the narrowing attribute is a geographic area, a type of business, or falls within some other category of information.

According to a step 1712, for each potential partner in the plurality of potential partners, a processor may be used to automatically identify the attribute of the potential partner corresponding to the identified attribute category in the electronic database, and automatically compare the identified attribute of the potential partner to the narrowing attribute. According to a step 1714, the processor may be used to determine whether the identified attribute of the potential partner is compatible with the narrowing attribute. For example, if the identified attribute category is a geographic area, then the processor may be used to automatically determine what geographic areas are served by each potential partner, and may determine whether the narrowing attribute falls within the geographic area or areas served by each potential partner. As another example, if the identified attribute category is a threshold success percentage, then the processor may automatically determine whether each potential partner has a success percentage higher than the threshold success percentage. If the identified attribute of the potential partner is compatible with the narrowing attribute, then the processor may allow the potential partner to remain in the plurality of potential partners. If not, then the processor may automatically eliminate the potential partner from the plurality of potential partners.

While the above-referenced steps are described as being performed by one processor, the steps may be performed by multiple processors working independently or in a networked fashion, such as in series or in parallel. In embodiments in which multiple processors perform the above-described steps, the processors may be connected via wired or wireless connections over an electronic network, such as the Internet or a local area network connection.

With regard to the graphical user interface embodiments and methods described above, the graphical user interface embodiments may be generated by one or more server processors, and may be displayed on one or more monitors or screens suitable for displaying user interfaces, such as computer monitors, tablet screens, and/or mobile phone screens. Optionally, data for generating the graphical user interface embodiments described herein may be generated or processed at one or more processors, and optionally transmitted over one or more electronic networks for rendering of user interfaces on one or more remote user processors and display on one or more remote monitors or screens.

Any aspect set forth in any embodiment may be used with any other embodiment set forth herein. Every user interface set forth herein may be generated by any single computer processor and/or server or combination of computer servers and/or processors, and may be displayed locally or remotely on any suitable interactive display, monitor or screen. Each method set forth herein may also be performed by any single computer processor, server, and/or display, or any combination of computer servers, processors, and/or displays.

It will be apparent to those skilled in the art that various modifications and variations can be made in the disclosed systems and processes without departing from the scope of the disclosure. Other embodiments will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method of automatically generating an electronic lead sharing display within a graphical user interface, comprising:

receiving, at a processor, an electronic database comprising a plurality of potential partners and a plurality of attribute categories, each potential partner in the plurality of potential partners having an attribute corresponding to each attribute category in the plurality of attribute categories;

receiving, at the processor, a plurality of threshold eligibility attributes, each threshold eligibility attribute in the plurality of threshold eligibility attributes corresponding to at least one of the attribute categories in the plurality of attribute categories;

using the processor to automatically narrow the plurality of potential partners using one or more of the plurality of threshold eligibility attributes as one or more narrowing attributes;

using the processor to automatically construct a potential-partner-specific electronic questionnaire specific to each potential partner among the narrowed plurality of potential partners, wherein the questionnaire comprises a plurality of automatically determined answerable prompts displayed on a graphical user interface, the plurality of automatically determined answerable prompts being based on the plurality of threshold eligibility attributes of the potential partner;

displaying the potential-partner-specific questionnaire in an interactive lead user interface;

receiving, at the processor, one or more answers to the potential-partner-specific questionnaire via the interactive lead user interface over the electronic network, wherein each answer comprises at least one lead attribute of the potential partner that corresponds to one of the plurality of attribute categories;

using the processor to automatically construct and store an electronic lead profile in the electronic database using the at least one lead attribute;

using the processor to automatically identify, as at least one narrowing attribute, the attribute of the potential partner corresponding to the identified attribute category in the electronic database;

using the processor to automatically compare the at least one narrowing attribute to the at least one lead attribute;

using the processor to automatically narrow the plurality of potential partners based on the comparison of the at least one narrowing attribute to the at least one lead attribute; and displaying the at least one lead attribute and the narrowed plurality of potential partners on a results user interface of the graphical user interface.

2. The method of claim 1, wherein the lead profile comprises a lead identity, the at least one lead attribute, and identification of the attribute category to which the at least one lead attribute corresponds.

3. The method of claim 2, further comprising displaying the electronic lead profile on the results user interface.

4. The method of claim 1, wherein automatically narrowing the plurality of potential partners comprises, for each narrowing attribute:

using a processor to automatically identify the potential partner category to which the narrowing attribute corresponds; and, for each potential partner in the plurality of potential partners:

using the processor to automatically determine whether the identified attribute of the potential partner is compatible with the narrowing attribute; and using the processor to eliminate the potential partner if the identified attribute of the potential partner is not compatible with the narrowing attribute.

5. The method of claim 4, wherein determining whether the identified attribute of the potential partner is compatible with the narrowing attribute comprises one or more of:

comparing a magnitude of the identified attribute of the potential partner to a magnitude of the narrowing attribute;

finding that the identified attribute of the potential partner is compatible with the narrowing attribute if the identified attribute of the potential partner encompasses the narrowing attribute; and finding that the identified attribute of the potential partner is compatible with the narrowing attribute if the identified attribute of the potential partner answers a given need identified in the narrowing attribute.

6. The method of claim 4, further comprising, for each narrowing attribute, using the processor to automatically count the number of potential partners in the plurality of potential partners, and, if the number of potential partners is no greater than a set number, then using the processor to automatically display a notification on a graphical user interface.

7. The method of claim 6, wherein the set number is zero or one.

8. The method of claim 1, wherein displaying the lead profile and the narrowed plurality of potential partners on a graphical user interface comprises displaying a name of the lead and the narrowed plurality of potential partners in the form of a list, wherein each potential partner in the list is selectable via the graphical user interface.

9. The method of claim 1, further comprising using the processor to automatically sort the plurality of potential partners using at least one of the plurality of threshold eligibility attributes as one or more sorting attributes, wherein automatically sorting the plurality of potential partners comprises, for each sorting attribute:

using a processor to automatically identify the potential partner category to which the sorting attribute corresponds;

using the processor to automatically identify the attribute of each potential partner in the plurality of potential partners corresponding to the identified attribute category in the electronic database; and using the processor to automatically sort the plurality of potential partners in an order based on the identified attributes of each potential partner in the plurality of potential partners.

10. A method of automatically generating an electronic lead sharing display of selectable potential partners within a graphical user interface, the method comprising:

receiving, at a processor, an electronic database comprising a plurality of potential partners and a plurality of attribute categories, each potential partner in the plurality of potential partners having an attribute corresponding to each attribute category in the plurality of attribute categories;

receiving, at the processor, a plurality of threshold eligibility attributes, each threshold eligibility attribute in the plurality of eligibility attributes corresponding to at least one of the attribute categories in the plurality of attribute categories;

using the processor to automatically narrow the plurality of potential partners using one or more of the plurality of threshold eligibility attributes as one or more threshold narrowing attributes, wherein automatically narrowing the plurality of potential partners comprises, for each threshold narrowing attribute:

using a processor to automatically identify the potential partner category to which the threshold narrowing attribute corresponds; and, for each potential partner in the plurality of potential partners:

using the processor to automatically identify the attribute of the potential partner corresponding to the identified attribute category in the electronic database and automatically compare the identified attribute of the potential partner to the threshold narrowing attribute;

using the processor to automatically determine whether the identified attribute of the potential partner is compatible with the threshold narrowing attribute; and using the processor to eliminate the potential partner if the identified attribute of the potential partner is not compatible with the threshold narrowing attribute;

using the processor to automatically construct a potential-partner-specific electronic questionnaire specific to each potential partner among the narrowed plurality of potential partners, wherein the questionnaire comprises a plurality of automatically determined interactive prompts displayed on a graphical user interface, the plurality of automatically determined interactive prompts being based on the plurality of threshold eligibility attributes of the potential partner;

displaying the potential-partner-specific questionnaire in an interactive lead user interface;

receiving, at the processor, one or more answers to the potential-partner-specific questionnaire via the lead user interface over the electronic network, wherein each answer comprises at least one lead attribute of the potential partner that corresponds to one of the plurality of attribute categories;

using the processor to automatically construct and store an electronic lead profile in the electronic database using the at least one lead attribute, wherein the lead profile comprises a lead identity, the at least one lead attribute, and identification of the attribute category to which the at least one lead attribute corresponds; and using the processor to automatically identify, as at least one narrowing attribute, the attribute of the potential partner corresponding to the identified attribute category in the electronic database;

using the processor to automatically compare the at least one narrowing attribute to the at least one lead attribute;

based on the comparison of the at least one narrowing attribute to the at least one lead attribute.

11. The method of claim 10, wherein automatically narrowing the plurality of potential partners comprises, for each lead-specific narrowing attribute:

using a processor to automatically identify the potential partner category to which the lead-specific narrowing attribute corresponds; and, for each potential partner in the plurality of potential partners:

using the processor to automatically determine whether the identified attribute of the potential partner is compatible with the lead-specific narrowing attribute; and using the processor to eliminate the potential partner if the identified attribute of the potential partner is not compatible with the lead-specific narrowing attribute.

12. The method of claim 11, further comprising using the processor to automatically sort the plurality of potential partners into a sorted order using at least one of the plurality of threshold eligibility attributes or at least one of the plurality of lead attributes as one or more sorting attributes, wherein automatically sorting the plurality of potential partners comprises, for each sorting attribute:

using the processor to automatically identify the potential partner category to which the sorting attribute corresponds;

using the processor to automatically identify the attribute of each potential partner in the plurality of potential partners corresponding to the identified attribute category in the electronic database; and using the processor to automatically place the plurality of potential partners in a sorted order based on the identified attribute; and displaying the at least one lead attribute and the narrowed plurality of potential partners on a graphical user interface.

13. The method of claim 10, wherein displaying the narrowed plurality of potential partners on a graphical user interface further comprises displaying the narrowed plurality of potential partners in a list, wherein each potential partner in narrowed plurality of potential partners is selectable.

14. The method of claim 12, further comprising displaying a selectable option to pair a lead associated with the at least one lead attribute and one or more selected potential partners.

15. The method of claim 12, wherein using the processor to automatically narrow the plurality of potential partners further comprises, for each threshold narrowing attribute or lead-specific narrowing attribute, using the processor to automatically count the number of potential partners in the plurality of potential partners, and if the number of potential partners is no greater than zero, then using the processor to automatically display a notification on a graphical user interface.

16. The method of claim 15, wherein the notification on the graphical user interface comprises a display of the potential partner, if any, in the plurality of potential partners.

17. A method of automatically displaying potential partners for a lead, comprising:

receiving, at a processor, an electronic database comprising a plurality of potential partners and a plurality of attribute categories, each potential partner in the plurality of potential partners having an attribute corresponding to each attribute category in the plurality of attribute categories;

receiving, at the processor, a plurality of threshold eligibility attributes, each threshold eligibility attribute in the plurality of threshold eligibility attributes corresponding to at least one of the attribute categories in plurality of attribute categories;

using the processor to automatically narrow the plurality of potential partners using one or more of the plurality of threshold eligibility attributes as one or more narrowing attributes;

using the processor to automatically construct a potential-partner-specific electronic questionnaire specific to each potential partner among the narrowed plurality of potential partners, wherein the questionnaire comprises a plurality of automatically determined interactive prompts displayed on a graphical user interface, the plurality of automatically determined interactive prompts being based on the plurality of threshold eligibility attributes of the potential partner;

displaying the potential-partner-specific questionnaire in an interactive lead user interface;

receiving, at the processor, one or more answers to the potential-partner-specific questionnaire from the lead user interface over the electronic network, wherein each answer comprises at least one lead attribute of the potential partner that corresponds to one of the plurality of attribute categories;

using the processor to automatically construct and store an electronic lead profile in the electronic database using the at least one lead attribute, wherein the lead profile comprises a lead identity, the at least one lead attribute, and identification of the attribute category to which the at least one lead attribute corresponds;

using the processor to automatically identify, as at least one narrowing attribute, the attribute of the potential partner corresponding to the identified attribute category in the electronic database;

using the processor to automatically compare the at least one narrowing attribute to the at least one lead attribute;

using the processor to automatically narrow the plurality of potential partners based on the comparison of the at least one narrowing attribute to the at least one lead attribute;

using the processor to automatically add the narrowed plurality of potential partners to the lead profile; and displaying the lead profile and the narrowed plurality of potential partners on a graphical user interface, wherein the display comprises a module showing the lead identity and the at least one lead attribute, a list of the plurality of potential partners wherein each potential partner is selectable by a user, and an option to assign at least one selected potential partner to a lead identified by the lead identity.

18. The method of claim 17, wherein automatically narrowing the plurality of potential partners comprises, for each narrowing attribute:

using a processor to automatically identify the potential partner category to which the narrowing attribute corresponds; and for each potential partner in the plurality of potential partners:

using the processor to automatically determine whether the identified attribute of the potential partner is compatible with the narrowing attribute; and using the processor to eliminate the potential partner if the identified attribute of the potential partner is not compatible with the narrowing attribute.

19. The method of claim 17, further comprising using the processor to automatically sort the plurality of potential partners using at least one of the plurality of threshold eligibility attributes or at least one of the plurality of lead attributes as one or more sorting attributes, wherein automatically sorting the plurality of potential partners comprises, for each sorting attribute:

using the processor to automatically identify the potential partner category to which the sorting attribute corresponds;

using the processor to automatically identify the attribute of each potential partner in the plurality of potential partners corresponding to the identified attribute category in the electronic database; and using the processor to automatically sort the plurality of potential partners in a sorted order based on the identified attribute.

20. The method of claim 19, wherein the list of the plurality of potential partners wherein each potential partner is selectable by a user is displayed in the sorted order.

* * * * *